United States Patent [19]

Toebes, VIII et al.

[11] Patent Number: 5,959,690
[45] Date of Patent: Sep. 28, 1999

[54] METHOD AND APPARATUS FOR TRANSITIONS AND OTHER SPECIAL EFFECTS IN DIGITAL MOTION VIDEO

[75] Inventors: John A. Toebes, VIII, Cary; Douglas J. Walker, Raleigh, both of N.C.

[73] Assignee: SAS Institute, Inc.

[21] Appl. No.: 08/801,254

[22] Filed: Feb. 19, 1997

Related U.S. Application Data

[60] Provisional application No. 60/014,716, Feb. 20, 1996, and provisional application No. 60/016,975, May 6, 1996.

[51] Int. Cl.[6] .................................................. H04N 7/32
[52] U.S. Cl. .......................... 348/578; 348/416; 348/699
[58] Field of Search ................................ 348/12, 13, 402, 348/407, 409–413, 416, 578, 584, 588, 589, 699, 714, 715, 718; 364/725.03; 386/109–112; 434/118; H04N 7/130, 7/32

[56] References Cited

U.S. PATENT DOCUMENTS

| | | | |
|---|---|---|---|
| 4,791,598 | 12/1988 | Liou et al. | 364/725.03 |
| 5,119,188 | 6/1992 | McCalley et al. | 358/86 |
| 5,185,819 | 2/1993 | Ng et al. | 382/56 |
| 5,228,859 | 7/1993 | Rowe | 434/118 |
| 5,287,437 | 2/1994 | Deering | 395/127 |
| 5,367,341 | 11/1994 | Schnorf | 348/616 |
| 5,412,479 | 5/1995 | Alig et al. | 348/594 |
| 5,414,455 | 5/1995 | Hooper et al. | 348/7 |
| 5,422,674 | 6/1995 | Hooper et al. | 348/409 |
| 5,434,678 | 7/1995 | Abecassis | 358/342 |
| 5,448,307 | 9/1995 | Gelissen et al. | 348/584 |
| 5,450,544 | 9/1995 | Dixon et al. | 395/164 |
| 5,450,599 | 9/1995 | Horvath et al. | 395/800 |
| 5,477,263 | 12/1995 | O'Callaghan et al. | 348/7 |
| 5,477,397 | 12/1995 | Naimpally et al. | 386/111 |
| 5,491,778 | 2/1996 | Gordon et al. | 395/133 |
| 5,504,585 | 4/1996 | Fujinami et al. | 358/335 |
| 5,521,630 | 5/1996 | Chen et al. | 348/7 |
| 5,526,131 | 6/1996 | Strolle et al. | 386/112 |
| 5,594,507 | 1/1997 | Hoarty | 348/584 |
| 5,602,592 | 2/1997 | Mori et al. | 348/415 |
| 5,621,464 | 4/1997 | Teo et al. | 348/390 |
| 5,623,311 | 4/1997 | Phillips et al. | 348/396 |
| 5,659,539 | 8/1997 | Porter et al. | 348/12 |

OTHER PUBLICATIONS

International Standard, Information technology—Coding of moving pictures and associated audio for digital storage media at up to about 1,5 Mbit/s—, Part 2: Video, Reference No. ISO/IEC 11172–2:1993(E), First edition 1993–08–01, pp. i–108.

*Primary Examiner*—Richard Lee
*Attorney, Agent, or Firm*—Moore & Van Allen, PLLC; Richard W. Evans

[57] ABSTRACT

A method and apparatus for transition effects in digitally compressed motion video, such video complying with the MPEG-1 standard. Transitions between two frames of video are effectuated by selecting a FROM frame and a TO frame, generating a stream of bidirectionally dependent duplicator frames which vary in their motion vector references to the FROM frame and the TO frame according to a predefined pattern, placing the FROM frame in the past buffer of a decoder, placing the TO frame in the future frame of a decoder, feeding the stream of duplicator frames to the decoder, causing the duplicator frames to be displayed, and beginning normal playback of the video stream containing the TO frame at the TO frame position.

16 Claims, 16 Drawing Sheets

FIG. 3

| Picture Type | End of GOP? | Byte Offset | End of Sequence? |
|---|---|---|---|
| I | | 20 | |
| P | | 14556 | |
| B | | 22571 | |
| B | | 23147 | |
| P | | 23723 | |
| B | | 31738 | |
| B | | 32314 | |
| P | | 32890 | |
| B | | 40905 | |
| B | √ | 41481 | √ |

FIG. 4a

Display Order

| Picture Type | I | B | B | P | B | B | P | B | B | P |
|---|---|---|---|---|---|---|---|---|---|---|
| Display Order Number | 0 | 1 | 2 | 3 | 4 | 5 | 6 | 7 | 8 | 9 |

FIG. 4b

Bitstream Order

| Picture Type | I | P | B | B | P | B | B | P | B | B |
|---|---|---|---|---|---|---|---|---|---|---|
| Display Order Number | 0 | 3 | 1 | 2 | 6 | 4 | 5 | 9 | 7 | 8 |

Example:
Frame Specific Access
to a B Frame

Example:
Frame Specific Access
to a P Frame

Example:
Frame Specific Access
to an I Frame

Frame Specific Access to MPEG Stream

Transition

FIG. 11a

| F00 | F01 | F02 | F03 | F04 | F05 | F06 | F07 | F08 | F09 |
|-----|-----|-----|-----|-----|-----|-----|-----|-----|-----|
| F10 | F11 | F12 | F13 | F14 | F15 | F16 | F17 | F18 | F19 |
| F20 | F21 | F22 | F23 | F24 | F25 | F26 | F27 | F28 | F29 |
| F30 | F31 | F32 | F33 | F34 | F35 | F36 | F37 | F38 | F39 |
| F40 | F41 | F42 | F43 | F44 | F45 | F46 | F47 | F48 | F49 |
| F50 | F51 | F52 | F53 | F54 | F55 | F56 | F57 | F58 | F59 |
| F60 | F61 | F62 | F63 | F64 | F65 | F66 | F67 | F68 | F69 |
| F70 | F71 | F72 | F73 | F74 | F75 | F76 | F77 | F78 | F79 |

FIG. 11b

| T00 | T01 | T02 | T03 | T04 | T05 | T06 | T07 | T08 | T09 |
|-----|-----|-----|-----|-----|-----|-----|-----|-----|-----|
| T10 | T11 | T12 | T13 | T14 | T15 | T16 | T17 | T18 | T19 |
| T20 | T21 | T22 | T23 | T24 | T25 | T26 | T27 | T28 | T29 |
| T30 | T31 | T32 | T33 | T34 | T35 | T36 | T37 | T38 | T39 |
| T40 | T41 | T42 | T43 | T44 | T45 | T46 | T47 | T48 | T49 |
| T50 | T51 | T52 | T53 | T54 | T55 | T56 | T57 | T58 | T59 |
| T60 | T61 | T62 | T63 | T64 | T65 | T66 | T67 | T68 | T69 |
| T70 | T71 | T72 | T73 | T74 | T75 | T76 | T77 | T78 | T79 |

FIG. 11c

| F01 | F02 | F03 | F04 | F05 | F06 | F07 | F08 | F09 | T00 |
|-----|-----|-----|-----|-----|-----|-----|-----|-----|-----|
| F11 | F12 | F13 | F14 | F15 | F16 | F17 | F18 | F19 | T01 |
| F21 | F22 | F23 | F24 | F25 | F26 | F27 | F28 | F29 | T02 |
| F31 | F32 | F33 | F34 | F35 | F36 | F37 | F38 | F39 | T03 |
| F41 | F42 | F43 | F44 | F45 | F46 | F47 | F48 | F49 | T04 |
| F51 | F52 | F53 | F54 | F55 | F56 | F57 | F58 | F59 | T05 |
| F61 | F62 | F63 | F64 | F65 | F66 | F67 | F68 | F69 | T06 |
| F71 | F72 | F73 | F74 | F75 | F76 | F77 | F78 | F79 | T07 |

FIG. 11d

| F02 | F03 | F04 | F05 | F06 | F07 | F08 | F09 | T00 | T00 |
|-----|-----|-----|-----|-----|-----|-----|-----|-----|-----|
| F12 | F13 | F14 | F15 | F16 | F17 | F18 | F19 | T01 | T11 |
| F22 | F23 | F24 | F25 | F26 | F27 | F28 | F29 | T02 | T12 |
| F32 | F33 | F34 | F35 | F36 | F37 | F38 | F39 | T03 | T13 |
| F42 | F43 | F44 | F45 | F46 | F47 | F48 | F49 | T04 | T14 |
| F52 | F53 | F54 | F55 | F56 | F57 | F58 | F59 | T05 | T15 |
| F62 | F63 | F64 | F65 | F66 | F67 | F68 | F69 | T06 | T16 |
| F72 | F73 | F74 | F75 | F76 | F77 | F78 | F79 | T07 | T17 |

FIG. 11e

| F03 | F04 | F05 | F06 | F07 | F08 | F09 | T00 | T00 | T20 |
|-----|-----|-----|-----|-----|-----|-----|-----|-----|-----|
| F13 | F14 | F15 | F16 | F17 | F18 | F19 | T01 | T11 | T21 |
| F23 | F24 | F25 | F26 | F27 | F28 | F29 | T02 | T12 | T22 |
| F33 | F34 | F35 | F36 | F37 | F38 | F39 | T03 | T13 | T23 |
| F43 | F44 | F45 | F46 | F47 | F48 | F49 | T04 | T14 | T24 |
| F53 | F54 | F55 | F56 | F57 | F58 | F59 | T05 | T15 | T25 |
| F63 | F64 | F65 | F66 | F67 | F68 | F69 | T06 | T16 | T26 |
| F73 | F74 | F75 | F76 | F77 | F78 | F79 | T07 | T17 | T27 |

FIG. 11f

| F04 | F05 | F06 | F07 | F08 | F09 | T00 | T00 | T20 | T30 |
|-----|-----|-----|-----|-----|-----|-----|-----|-----|-----|
| F14 | F15 | F16 | F17 | F18 | F19 | T01 | T11 | T21 | T31 |
| F24 | F25 | F26 | F27 | F28 | F29 | T02 | T12 | T22 | T32 |
| F34 | F35 | F36 | F37 | F38 | F39 | T03 | T13 | T23 | T33 |
| F44 | F45 | F46 | F47 | F48 | F49 | T04 | T14 | T24 | T34 |
| F54 | F55 | F56 | F57 | F58 | F59 | T05 | T15 | T25 | T35 |
| F64 | F65 | F66 | F67 | F68 | F69 | T06 | T16 | T26 | T36 |
| F74 | F75 | F76 | F77 | F78 | F79 | T07 | T17 | T27 | T37 |

FIG. 11g

| F05 | F06 | F07 | F08 | F09 | T00 | T00 | T20 | T30 | T40 |
|-----|-----|-----|-----|-----|-----|-----|-----|-----|-----|
| F15 | F16 | F17 | F18 | F19 | T01 | T11 | T21 | T31 | T41 |
| F25 | F26 | F27 | F28 | F29 | T02 | T12 | T22 | T32 | T42 |
| F35 | F36 | F37 | F38 | F39 | T03 | T13 | T23 | T33 | T43 |
| F45 | F46 | F47 | F48 | F49 | T04 | T14 | T24 | T34 | T44 |
| F55 | F56 | F57 | F58 | F59 | T05 | T15 | T25 | T35 | T45 |
| F65 | F66 | F67 | F68 | F69 | T06 | T16 | T26 | T36 | T46 |
| F75 | F76 | F77 | F78 | F79 | T07 | T17 | T27 | T37 | T47 |

FIG. 11h

| F06 | F07 | F08 | F09 | T00 | T00 | T20 | T30 | T40 | T50 |
|-----|-----|-----|-----|-----|-----|-----|-----|-----|-----|
| F16 | F17 | F18 | F19 | T01 | T11 | T21 | T31 | T41 | T51 |
| F26 | F27 | F28 | F29 | T02 | T12 | T22 | T32 | T42 | T52 |
| F36 | F37 | F38 | F39 | T03 | T13 | T23 | T33 | T43 | T53 |
| F46 | F47 | F48 | F49 | T04 | T14 | T24 | T34 | T44 | T54 |
| F56 | F57 | F58 | F59 | T05 | T15 | T25 | T35 | T45 | T55 |
| F66 | F67 | F68 | F69 | T06 | T16 | T26 | T36 | T46 | T56 |
| F76 | F77 | F78 | F79 | T07 | T17 | T27 | T37 | T47 | T57 |

FIG. 11i

| F07 | F08 | F09 | T00 | T00 | T20 | T30 | T40 | T50 | T60 |
|-----|-----|-----|-----|-----|-----|-----|-----|-----|-----|
| F17 | F18 | F19 | T01 | T11 | T21 | T31 | T41 | T51 | T61 |
| F27 | F28 | F29 | T02 | T12 | T22 | T32 | T42 | T52 | T62 |
| F37 | F38 | F39 | T03 | T13 | T23 | T33 | T43 | T53 | T63 |
| F47 | F48 | F49 | T04 | T14 | T24 | T34 | T44 | T54 | T64 |
| F57 | F58 | F59 | T05 | T15 | T25 | T35 | T45 | T55 | T65 |
| F67 | F68 | F69 | T06 | T16 | T26 | T36 | T46 | T56 | T66 |
| F77 | F78 | F79 | T07 | T17 | T27 | T37 | T47 | T57 | T67 |

FIG. 11j

| F08 | F09 | T00 | T00 | T20 | T30 | T40 | T50 | T60 | T70 |
|-----|-----|-----|-----|-----|-----|-----|-----|-----|-----|
| F18 | F19 | T01 | T11 | T21 | T31 | T41 | T51 | T61 | T71 |
| F28 | F29 | T02 | T12 | T22 | T32 | T42 | T52 | T62 | T72 |
| F38 | F39 | T03 | T13 | T23 | T33 | T43 | T53 | T63 | T73 |
| F48 | F49 | T04 | T14 | T24 | T34 | T44 | T54 | T64 | T74 |
| F58 | F59 | T05 | T15 | T25 | T35 | T45 | T55 | T65 | T75 |
| F68 | F69 | T06 | T16 | T26 | T36 | T46 | T56 | T66 | T76 |
| F78 | F79 | T07 | T17 | T27 | T37 | T47 | T57 | T67 | T77 |

FIG. 11k

| F09 | T00 | T00 | T20 | T30 | T40 | T50 | T60 | T70 | T80 |
|-----|-----|-----|-----|-----|-----|-----|-----|-----|-----|
| F19 | T01 | T11 | T21 | T31 | T41 | T51 | T61 | T71 | T81 |
| F29 | T02 | T12 | T22 | T32 | T42 | T52 | T62 | T72 | T82 |
| F39 | T03 | T13 | T23 | T33 | T43 | T53 | T63 | T73 | T83 |
| F49 | T04 | T14 | T24 | T34 | T44 | T54 | T64 | T74 | T84 |
| F59 | T05 | T15 | T25 | T35 | T45 | T55 | T65 | T75 | T85 |
| F69 | T06 | T16 | T26 | T36 | T46 | T56 | T66 | T76 | T86 |
| F79 | T07 | T17 | T27 | T37 | T47 | T57 | T67 | T77 | T87 |

PUSH RIGHT

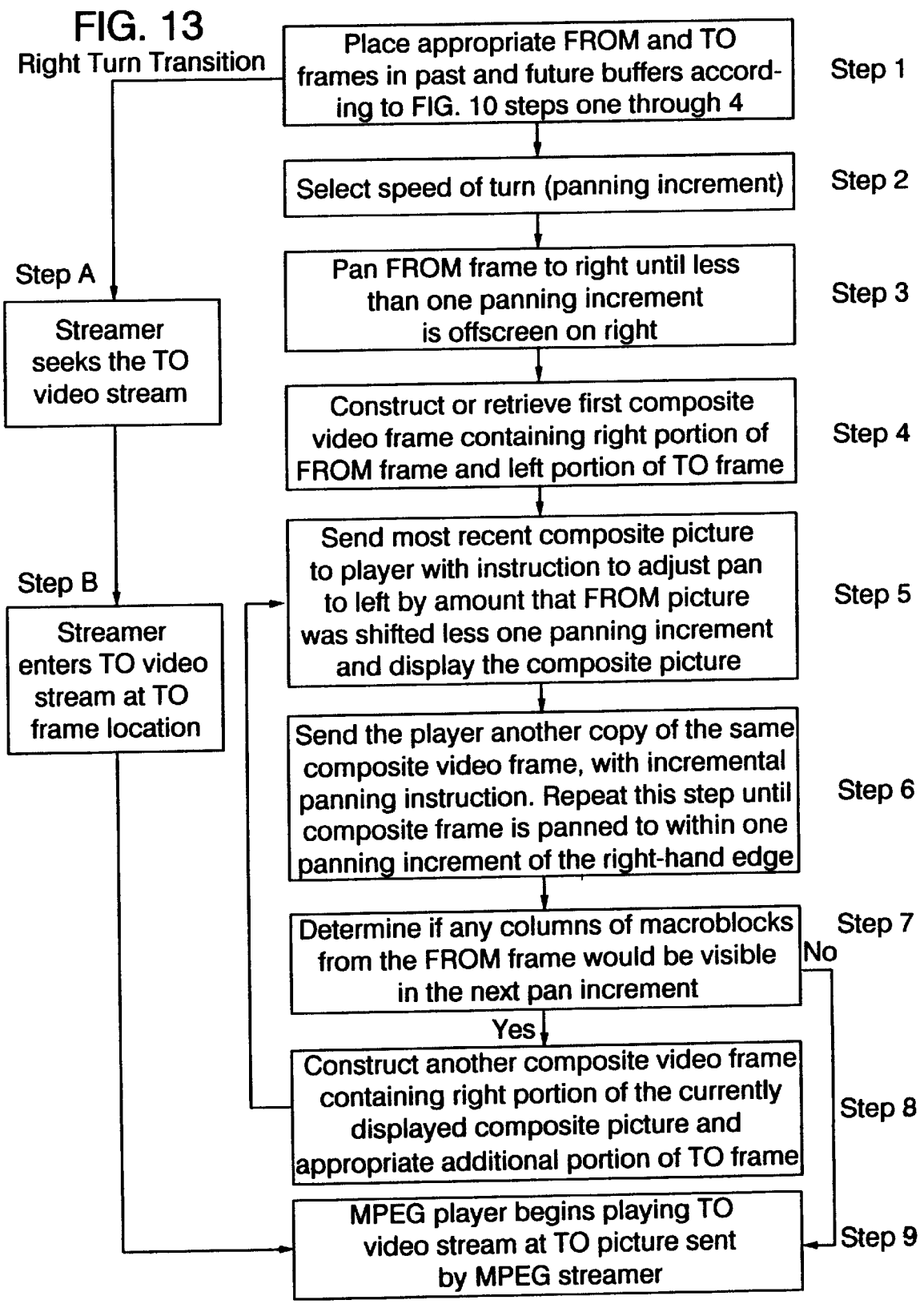

Right Turn

Right Turn

Right Turn

Right Turn

METHOD AND APPARATUS FOR TRANSITIONS AND OTHER SPECIAL EFFECTS IN DIGITAL MOTION VIDEO

CROSS-REFERENCES

This application claims the benefit of of U.S. Provisional Application No. 60/014,716, filed Feb. 20, 1996, and U.S. Provisional Application No. 60/016,975, filed May 6, 1996.

BACKGROUND

1. Field of the Invention

The present invention relates to the field of digital motion video and more particularly to a system and techniques for altering and decompressing digital motion video signals in a manner which allows efficient reverse play of the motion video as well as efficient, frame-level access and play of the motion video stream for creation of other special video effects. The system and techniques are compatible with the MPEG-1 standard adopted by the International Standards Organization's (ISO's) Moving Picture Experts Group (MPEG), however the invention taught herein may also be applied to other video coding algorithms which share some of the features of the MPEG algorithm, such as Intel Corporation's Indeo™ and Indeo Video Interactive algorithms, the Fractal Codec algorithm from Iterated Systems of Atlanta, Ga., MVI from Sirius Publishing of Scottsdale, Ariz., Cinepak from Radius of Sunnyvale, Calif. and the Smacker 2.0 algorithm from RAD Software of Salt Lake City, Utah.

2. Environment

The present invention relates generally to the field of digital video and more specifically to the coding and compression of analog video signals into digital video and the decoding and decompression of the digital bitstream into a displayable video signal. Digital video compression is used in a variety of applications where video images are displayed in a system where available bandwidth is limited, such as video telephone, digital television and interactive multimedia using such digital storage technology as CD-ROM, digital audio tape and magnetic disk. Such applications require digital video coding, or video compression to achieve the necessary high data transfer rates over relatively low bandwidth channels.

Various standards have been proposed and are in use for video coding. The standards vary from application to application in resolution and frames per minute allowed based, among other things, on the bandwidth available in the particular application. Several of these standards involve algorithms based on a common core of compression techniques, including transform coding, such as that employing the Discrete Cosine Transform. See K. R. Rao and P. Yip, DISCRETE COSINE TRANSFORM, ALGORITHMS, ADVANTAGES, APPLICATIONS, San Diego, Calif., Academic Press, 1990, and H. Ahmed, T. Ratarajan, and K. R. Rao, *Discrete Cosine Transform*, IEEE TRANSACTIONS ON COMPUTERS, pp. 90–93, January 1974. See also U.S. Pat. No. 4,791,598 entitled "Two-Dimensional Discrete Cosine Transform Processor," issued Dec. 13, 1988.

This invention relates most specifically to those digital video applications where the user interacts with the system in ways which can modify the video display, such as in interactive computer games or other interactive multimedia applications. In particular, digital video systems, such as MPEG video players in personal computers or video game machines would benefit from use of the apparatus and methods of the present invention to allow more efficient and realistic navigation through a video world, creation of special effects, frame specific search and access to a video stream and reverse playback of a video stream.

The MPEG-1 Video Compression Algorithm

The ISO's MPEG-1 algorithm is designed to yield a true TV-like image with compression ratios around 180:1 at data rates low enough for use in storage applications with data transfer rates at or below 1.5 Mb/s (megabits/sec), comparable to those used on CD-ROM drives on personal computers. While the algorithm is designed for such data rates, it is usable at higher data rates. The inventor routinely uses data rates of 2 to 2.5 Mb/s. MPEG-1 is designed to work with images having a one-fourth of broadcast-quality resolution: 352 by 240 pels. This is approximately the quality of a picture presented by standard VHS video cassettes.

An MPEG-1 stream may consist of 0 to 16 separate video streams, 0 to 32 separate audio streams, any of which may be in stereo, and possibly other customized streams carrying user-specified information and padding bytes. The various streams are multiplexed into a single MPEG composite stream called a "system stream." This invention relates to the manipulation of an MPEG-1 video stream. It also relates to ways of de-multiplexing the system stream to create an actual or virtual non-multiplexed, valid MPEG stream.

The further aspects of the MPEG video standard, including the other data streams which comprise the MPEG system stream, are well known in the art, are extensively discussed in the literature, including International Standard ISO/IEC 11172-2, entitled "Information technology—Coding of moving pictures and associated audio for digital storage media at up to about 1.5 Mbit/s—Part 2: Video" dated Aug. 1, 1993 and will not be further discussed here. Similarly, the application of the present invention to other systems of video data compression does not require discussion of analogous aspects of those systems.

A single video stream consists of a sequence of pictures. These pictures are also referred to as "frames." The MPEG video stream is normally created by subjecting video data representing a video picture or frame to several digital compression steps. The MPEG-1 encoding scheme includes intra-frame compression which seeks to reduce redundancies within a frame and inter-frame compression which uses motion compensation to identify and eliminate redundancies between sequential frames. Motion compensation takes advantage of the movement of picture elements that remain approximately the same within a series of sequential frames but change position from frame to frame.

In MPEG, motion compensation is accomplished by employing a sequence of types of frames with various characteristics within a related group of pictures. The three types of frames possible in normal MPEG video are I-frames (Intra), P-frames (Predictive), and B-frames (Bidirectional). A fourth type of frame, the D-frame, is defined in the standard but is intended for use only as an indexing and overview feature and cannot be mixed with I, B, and P frames. I and P frames are collectively called reference frames since other frames can be based on them. I frames contain all of the information needed to reconstruct one frame of video. P-frames can use information from the previously displayed reference frame and can add new information. B frames can use information from either the previously displayed reference frame, the next reference frame that will be displayed, or both, and can also add new information.

Since B frames can depend on a frame that will be displayed at some point in the future, the pictures in the MPEG bitstream are encoded and stored in a different order than they will be displayed. The order that the pictures are intended to appear on the screen is referred to as the "display order," and the order that the pictures appear in the bitstream is referred to as the "bitstream order." Bitstream order is optimized to provide the necessary reference pictures at the appropriate time to allow efficient parsing and decoding when the stream is played forward, removing the need to back up or skip forward to display the stream. Because MPEG is optimized for forward play, backward play is especially challenging. Further, before the current invention, efficient backward play, that is backward play of acceptable speed and quality, was not obtainable on a machine with only the memory resources required for acceptable forward play.

The MPEG standard also defines the concept of a Group of Pictures (GOP). Each GOP contains at least one I-frame and may contain additional I, B, and P frames. There is no limit on the size of a GOP. The GOP may begin in display order with one or more B-frames that refer to the last reference frame in the previous GOP, but no GOP may end with a frame that refers to the next GOP in the display order. Each GOP begins with a header which contains parameters to assist in decoding the video stream. While such parameters can be different for every GOP in the stream, they typically are the same for all GOPs in a stream.

Finally, the MPEG standard defines a "sequence." A sequence is a sequential group of GOPs in an MPEG stream. Each sequence begins with a sequence header which contains parameters which may be used to assist in decoding the sequence.

The video data is broken down into a luminance or Y component and two color difference components, Cr (red chrominance) and Cb (blue chrominance). The individual pictures can be represented as arrays of Y, Cr and Cb values. The Cr and Cb values are subsampled with respect to the Y values by 2:1 in both the horizontal and vertical directions, therefore there is one Cr and one Cb value for each four Y values.

Pictures are broken down into macroblocks, which are contiguous regions of 16×16 pels. The Y component is represented by four 8×8 contiguous blocks for each 16×16 macroblock. The Cr and Cb components are represented by a single 8×8 block for each component, but due to the subsampling discussed above the Cb 8×8 block and the Cr 8×8 block each cover the same area of the screen as the four 8×8 Y blocks. The macroblock, therefore, consists of six 8×8 blocks, each limited to one component and all superimposed in the 16×16 pel area of the display covered by the four 8×8 Y blocks.

In MPEG-1 coding the six blocks comprising the macroblock are each subjected to a Discrete Cosine Transformation (DCT) algorithm that transforms them losslessly into 8×8 matrices that represent on each axis increasing horizontal and vertical frequency. Further compression steps take place to reduce the range of the values and encode them using a Huffinan-type compression algorithm, but the specific algorithms used in the further compression steps are not relevant to the present invention.

All macroblocks in an I picture are intra-coded. This means that all their DCT coefficients are encoded directly into the bitstream with no references to other pictures.

Each macroblock in a P picture may or may not have their DCT coefficients directly coded (herein referred to as "intra-coded" information), and each may or may not have a reference to a 16×16 pel area in the most recently displayed reference frame (such references are referred to as "motion vectors" in the ISO/IEC standard 11172-2 or as "inter-" coded information). If both motion vector information and intra-coded information are present, the values are added. Either intra-coded information or an inter-coded reference to the next reference frame must be supplied for each macroblock.

Each macroblock in a B picture may or may not have intra-coded information, may or may not have a reference to a 16×16 pel area in the most recently displayed reference frame, and may or may not have a reference to a 16×16 pel area in the next reference frame that will be displayed. If references to both the previous and next reference frames are present, the values in the two frames are averaged and added to the intra-coded information, if any. Either intra-coded information or an inter-coded reference, either to the next reference frame, the previous reference frame or both the next and previous reference frames, must be available for each macroblock, although the standard allows the information to be inherited from previous macroblocks in some cases.

As the stream is parsed and decoded, the MPEG player constantly keeps the last two reference frames available for use in decoding B and P frames when they appear. The first reference frame decoded is placed in the future buffer. When a new reference frame is encountered in the decoder's parsing of the bitstream (bitstream order), the previous "future" frame becomes the "past" frame and is normally displayed at that time. The new reference frame is read into the future buffer and becomes the future frame. These available reference frames are known as the "past" and "future" frames or pictures and are normally kept in portions of the computer or decoder memory known respectively as the "past" and "future" buffers. As mentioned above, P frames may refer to past reference frames, and B frames may refer to past and/or future reference frames. The appropriate reference frames must be in the appropriate buffers of the MPEG player for the P and B frames to be properly decoded. The MPEG bitstream is designed so that the proper frames will always be in the appropriate buffers when dependent frames are presented for decoding. If the past and future buffers contain the correct values and the MPEG decoder decodes the B picture, the correct picture will be displayed on the screen. However, the contents of these buffers change frequently during normal play. This makes it difficult to play a dependent frame except in the original linear video order.

As used in this disclosure, the terms "parsed" and "decoded" are virtually synonymous. They both refer to the various processes employed by the computer and MPEG player whereby the digital information contained in the compressed video stream is accessed, manipulated, converted into bitmaps and displayed in the proper order. However as explained herein, a compressed, digitized video stream may be partially or completely parsed or decoded. Thus, parsing or decoding may refer to only one or less than all steps necessary for complete decoding of the stream information. Similarly, as is here made evident, a GOP, picture, or portion of a picture may be completely or incompletely parsed for reasons other than display. Depending on the context in which they are used, the terms "parse" or "decode" may refer only to preliminary steps in the decoding process, such as those steps necessary to determine whether a certain picture is an I, P or B frame, or may refer to the entire process of decoding the picture and displaying the resultant bitmap.

As used in this disclosure, the terms "frame" and "picture" are also virtually synonymous. They both refer to a single video picture, whether or not it is coded.

Frame accurate access to the video stream is not necessary for broadcast, satellite or cable video programming applications. However, it is desirable for many other uses of MPEG, particularly in interactive, multimedia computer applications such as computer games. It would be desirable to use MPEG video "worlds" in interactive educational and game programs. It would further be desirable to have frame accurate access to the MPEG video streams comprising such video worlds, subplots, and the like.

Although there are suggestions in ISO/IEC 11172-2 regarding random access, reverse play and other special effects, no adequate methodology has been provided for achieving random access at frames other than I frames or for achieving reverse play of MPEG video with computer memory resources no greater than those required for forward play.

The MPEG standard has been designed primarily to support normal, forward linear playback of a digital video stream in display order. However, the standard also refers to possible additional operations including random access, fast search, reverse playback, error recovery, and editing. The MPEG standard also mentions the possibility of reverse playback. Reverse playback poses particular problems because of the directionality enforced by the MPEG standard in encoding groups of pictures. Only I frames can be individually accessed and decoded. Neither B nor P pictures contain sufficient information to generate a complete frame without reference to previous (bitstream order) pictures. As with other digital streams, an MPEG stream has directionality and is incomprehensible if read backwards bit by bit. Further, the bitstream order of an MPEG stream has a definite directionality on the Group of Pictures level as well. Consequently, only reverse play of I frames can be achieved by simply reading the frames into the decoder in either reverse display order or in reverse bitstream order.

The MPEG standard suggests performing reverse playback by decoding GOP's in the ordinary fashion, storing the decoded bitmaps in a memory buffer and then displaying the bitmaps in reverse order. While this method results in a reverse playback with equal quality to the forward playback, by requiring storing of decoded pictures before playback, it places significant greater demands on computing resources, particularly memory resources than does forward MPEG. Another method is to decode only the I frames in each group of pictures. While this method eliminates the bit map buffer requirement, it results in either loss of temporal resolution (where there is a significant number of B and P pictures skipped) or loss of compression (where the original video sequence is coded primarily in I frames to allow for smoother reverse playback).

Another method of creating a similar effect would be to avoid reverse play of an MPEG stream by storing "forward" and "backward" video contents in standard unidirectional MPEG streams to simulate reverse play by having the run-time system switch from the appropriate forward stream to the corresponding reverse stream when the "reverse" command is given by the user. While eliminating the need for memory resources which the bit map storage method requires and eliminating the loss of temporal resolution which the I frame only method may involve, such a system would double the storage requirements for the video information files which are to be made available for forward and reverse play. Further, such a solution would require limitation of the points along the video stream where a reverse command could be executed and/or complete synchronization of the forward and reverse MPEG streams. Such a solution would also require a seek to the reverse stream every time a reverse command is given, slowing down navigation of the video world.

While reverse play is not necessary for broadcast, satellite, or cable video programming applications, it is desirable for many other uses of MPEG, particularly in interactive, multimedia computer applications, such as computer games. It would be desirable to use MPEG video "worlds" in interactive educational and game programs. It would further be desirable to have such worlds navigable in the forward and reverse directions without doubling the MPEG storage requirements for creation of such a world.

Further, there has been no method suggested for creating meaningful transitions between separate MPEG video streams, or solving the problem of delay in the display of information during the seek time required to transition from one video stream to another. As all of the methods of MPEG frame specific access, reverse play and stream to stream transitions attempted to date have limitations which makes their use in interactive multimedia personal computer applications limited, there is needed more efficient methods to accomplish these functions.

SUMMARY OF THE INVENTION

It is therefore an object of the present invention to provide a method and apparatus for providing in a personal computing system with relatively modest resources random, frame accurate access to an MPEG video stream at any frame. It is a further object of this invention to provide in such a computing system high quality reverse play of MPEG video streams using computing resources approximately the same as those required for forward MPEG play. It is a further object of this invention to provide meaningful transitions which can enhance the user experience and can also serve to provide meaningful video content while masking seeking time delays.

A method and system according to the present invention comprises a self-contained interactive multimedia computer system, such as a Microsoft Windows compatible personal computer with a 90 MHz Pentium processor, SVGA video display and software or hardware MPEG decoder, which is pre-programmed to allow the user to access MPEG video streams on a frame specific basis, play such video streams in the reverse direction, and create or play meaningful MPEG transitions which can be played while the system is seeking the "to" video stream of the transition, and to construct, edit and navigate multimedia video based environments and applications based thereon having such capabilities.

BRIEF DESCRIPTION OF THE DRAWINGS

Other objects, features and advantages of the present invention will become more fully apparent from the following detailed description of a preferred embodiment, the appended claims and the accompanying drawings in which:

FIG. 3 is an example of a video stream index according to a preferred embodiment of the present invention.

FIG. 4a is an example of a video stream shown in display order.

FIG. 4b is an example of the video stream of FIG. 4a shown in bitstream order.

FIG. 11 and its parts 11a through 11k is an illustration of a transition according to the invention.

FIG. 13 is a process flow diagram showing the process of a preferred embodiment of a turn transition, incorporating panning and composite pictures according to the invention.

DESCRIPTION OF PREFERRED EMBODIMENTS

Figure 1:
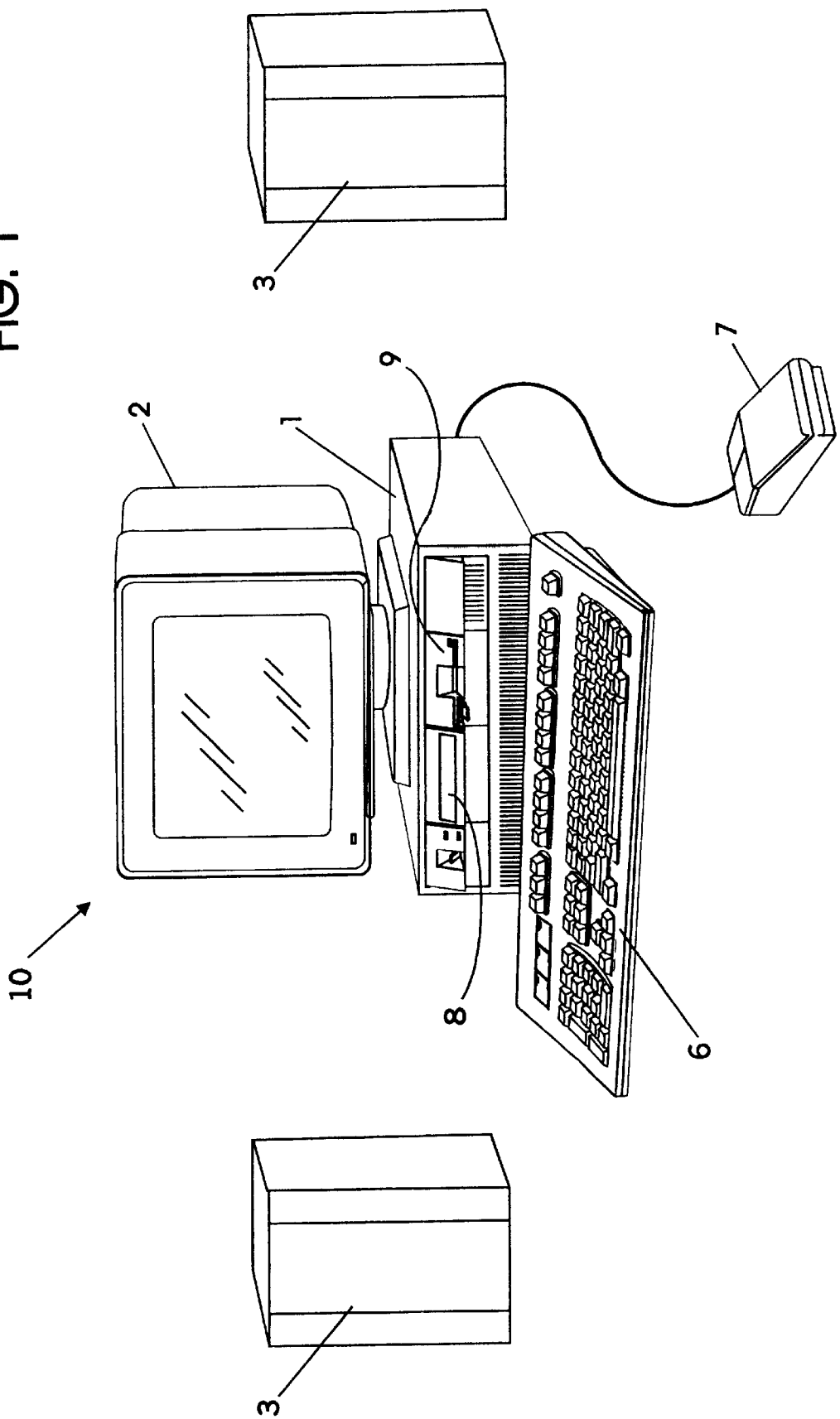
FIG. 1 is a block diagram of a video system for displaying video images in a PC environment, according to a preferred embodiment of the present invention.

The present invention is directed to providing an apparatus and method for random playback and reverse playback of digitally compressed video bitstreams without loss of quality or temporal resolution while minimizing the impact of such playback on processing time and memory resources and to providing meaningful transitions between different video streams or video frames. By random playback, we mean that any frame in a video stream may be the first in that stream to be displayed. Once such random access is achieved, the invention allows for normal forward play to continue from the randomly accessed frame or for reverse playback to begin from such frame. By reverse playback, we mean the display of an MPEG video stream in reverse display order beginning at any selected frame within the video stream.

In the preferred embodiment, the GOP and Sequence header portions of the MPEG video stream are ignored and the MPEG player is set to use the default setting for all quantization matrices. It is a trivial matter to cause the MPEG player to load quantization matrices in the parsing process should this be desired in a particular application of the invention. Although in the MPEG ISO/IEC standard the sequence header portion of the MPEG video stream can be used to adjust the bit rate, in practice available decoders, ignore this parameter. The bit rate is not an issue as long as it is within the decoder's upper bound of bit rate handling capacity. Consequently, although it would be a trivial matter to have the MPEG streamer of the present invention adjust the bit rate parameter in the sequence header, the preferred embodiment, as do currently available MPEG players, ignores bit rate information in the sequence header.

Further, the preferred embodiment of the present invention does not use the temporal reference field of the MPEG stream. As a practical matter, available decoders do not use temporal reference data. However, it would be a trivial matter to cause the streamer to adjust the temporal reference field, should it be desired to use the invention in combination with an MPEG player which uses this information.

The present invention may comprise either a hardware or software MPEG player. Hardware players use special video processing chips, either on the computer's motherboard, or more commonly, on a special video card in the computer. Typically these chips speed up the process of decoding the MPEG video and/or the process of drawing the decoded video on the screen. Software players, on the other hand, do most of the work with program logic, and use only conventional computer hardware to display the decoded video.

The method and apparatus of the present invention preferably requires an MPEG player capable of parsing certain arbitrary sections of the bitstream without updating the display to display the resulting pictures on the screen, leaving the previously displayed picture on the screen and without playing any audio associated with the sections parsed. We refer to the operation of an MPEG player where updating the display and audio is suppressed as playing the MPEG player in "suppression mode." The invention also preferably requires use of an MPEG player capable of accessing MPEG data stored in a memory buffer instead of merely the MPEG file. In the case of hardware or combination hardware/software decoders, this ability is usually a function of the player's software drivers, rather than a limitation of the hardware itself. Therefore, it can be solved in the case of such MPEG players by replacing the available drivers with more sophisticated ones. In the preferred embodiment, the computer system incorporates a software MPEG decoder, such as SoftMotion from SAS Institute Inc. of Cary, N.C.

Referring now to FIG. 1, there is shown a block diagram of a video system comprised of a multimedia computer system 10 which could be employed to implement the present invention. In FIG. 1, a computer system 10 is shown having a Pentium® 90 MHz CPU based computer 1 with a 540 MB internal hard drive, a CD ROM drive 8, a disk drive 9, a SVGA monitor 2, speakers 3, a keyboard 6, and a pointing device 7.

The computer could be connected to a local area network and/or modem for accessing resources not located within the computer's local drives. Implementation of other user interface devices, add-ons, operating systems and peripherals would be obvious to those skilled in the art and will not be discussed further herein.

Figure 2:
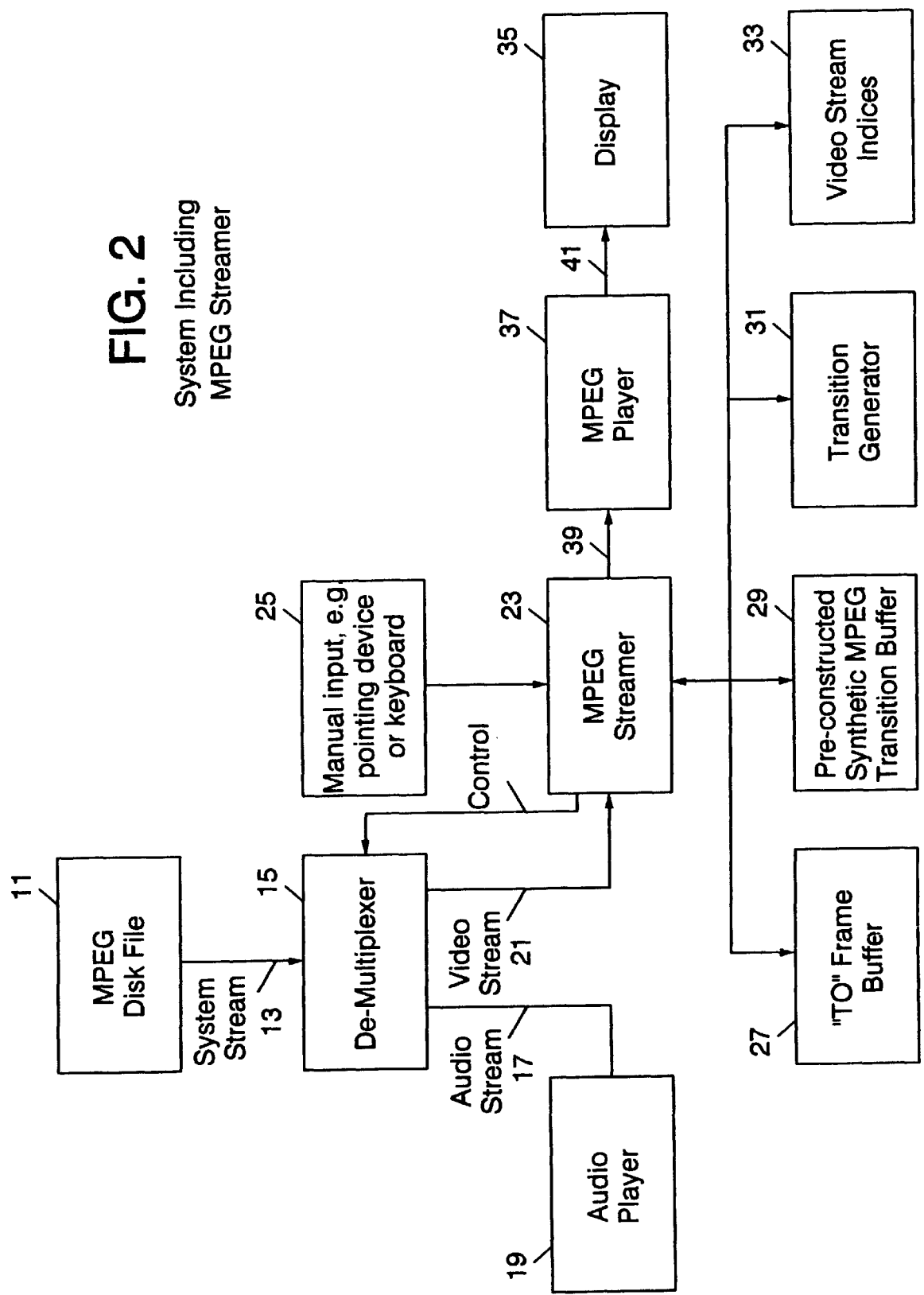
FIG. 2 is a block diagram of a system, including an MPEG streamer, according to a preferred embodiment of the present invention.

Referring now to FIG. 2, there is shown a block diagram of a hardware/software system according to the present invention. The central component in such a system is the MPEG Streamer 23. The MPEG Streamer can retrieve the video stream from an MPEG disk file 11, usually contained on a CD-ROM disk in a CD-ROM drive 8 as shown in FIG. 1. As the data on the CD-ROM disk file is multiplexed with audio data and other data into a system stream 13, the data must first be de-multiplexed by a de-multiplexer 15 in order for the video stream data 21 to be separated from the other types of data in the system stream. Among the other types of data in the stream is the audio stream which is fed by the de-multiplexer to the audio player 19. The video stream data fed to the MPEG Streamer 23 also includes video indices which are placed by the streamer in the appropriate buffer 33, "TO" frames placed by the streamer in the "TO" frame buffer 27 and pre-constructed synthetic MPEG transition sequences which are placed in the transition buffer 29. Alternatively or in addition, the system may include a transition generator 31 which generates the desired synthetic MPEG for transitions in response to the request for such from the MPEG streamer 23.

MPEG Streamer

The MPEG streamer function is an important component of the preferred embodiment of the invention. It essentially constructs a continuous virtual MPEG stream out of the source MPEG to send to the decoder. As far as the MPEG player is concerned, the MPEG stream never ends and no seeking is ever requested. Consequently, the MPEG decoder never needs to initialize as it otherwise would have to do every time a seek is needed. Decoder initialization sequences may cause the skipping of some frames of a stream and will cause a delay as the player decodes initial frames before beginning to display video. The streamer manufactures the continuous MPEG stream by assembling MPEG data from selected segments of the MPEG stream(s), and from transition data. In effect, the streamer does the seeking required outside of the MPEG player. When a seek is done, the streamer joins the new MPEG frames to the old ones so that the MPEG player sees what looks like a single MPEG stream with no interruptions. The streamer also injects the "synthetic" MPEG frames generated during transitions into its output stream.

The MPEG streamer accepts manual inputs as well as responding to positional data contained within the program to seek and access the appropriate video data to send to the MPEG player 37. The video stream 39 sent to the MPEG player is referred to as the virtual video stream because the system may contain frames which are synthesized by the MPEG streamer and inserted into a "video stream" according to the invention, although in reality no preexisting stream with these characteristics exists.

The MPEG streamer 23, usually a software entity, is constructed so that, in conjunction with a de-multiplexer 15, it reads a base MPEG video stream, such as that on a video disc, and constructs a second valid MPEG stream 39 derived from the base stream and, possibly, other sources for the MPEG player to play. Preferably such MPEG streamer creates an actual or virtual non-multiplexed MPEG video stream capable of being manipulated according to the method of the invention. Such component or software entity may also include the ability to accept user input 25 and execute various seeking transactions as described herein to queue other data for "streaming" into the MPEG player.

The method and apparatus of the present invention uses the MPEG streamer's ability to construct a derived stream from various components and to manipulate the derived stream according to the invention to accomplish frame accurate access, reverse playback and other special effects. The streamer has the ability to duplicate, omit or reorder pictures present in the base video stream and the ability to insert pictures into the video stream from other sources.

In the preferred embodiment the MPEG player does not make use of the temporal reference field described in the MPEG standard and available in the MPEG stream. If the MPEG player on which the invention is to be practiced does use the temporal reference field, the MPEG streamer must contain means for adjusting the temporal reference data in the MPEG stream it creates to have the correct temporal reference data. The functionality of the MPEG streamer used in the preferred embodiment of the invention is shown in the annotated source code for the interface definition of such a streamer attached hereto as Attachment 1 and incorporated herein by reference.

Video Stream Frame Index

Further according to the invention, although the method will function without such an entity, the method preferably creates an index of the MPEG stream to provide more rapid searching of said stream. Such index preferably is an array of video stream offset numbers in bitstream order which indicates at what byte each picture starts and whether the picture is an I, P or B picture. If the MPEG video stream being decoded uses the GOP headers or sequence headers within the stream to alter the MPEG player's state, the index should also contain flags indicating whether the picture is the last picture in a GOP (in bitstream order) or the last picture in a sequence (in bitstream order). These last two flags allow the streamer to locate, read and parse the appropriate GOP and sequence headers where these are important in placing the player in the appropriate state. While such an index can be created during runtime, for greater efficiency such index is preferably created for each MPEG stream which will be present in a product incorporating the invention during the creation of the product rather than being created during play of the product. Such pre-constructed indices are loaded into buffer when appropriate during runtime. The index may be stored in a separate file or in the file containing the video stream. If it is stored with the video stream, it may be stored as a composite stream, as user data, in the fields of the video stream (e.g., GOP timestamp, temporal reference, vbv delay, etc.), as a non-standard extension of the video data, or as a single chunk at a known location within the video stream.

FIG. 3 shows an example of an index according to the invention. The headings are provided for illustration and convenience and are not necessarily present in the software index entity. The first column in FIG. 3 indicates the type of frame of all of the frames in the MPEG stream indexed, in bitstream order. The second column indicates whether the frame is the last frame in a GOP. The third column indicates the offset byte number showing the location of the frame in the bitstream. Preferably the index refers to the de-multiplexed MPEG stream offset number rather than the multiplexed system stream offset number. The fourth column indicates whether the frame is the last frame in a sequence.

Frame Specific Access to MPEG Stream

According to the present invention, an MPEG player with the capability of suppressing display of a parsed MPEG stream while continuing to display the previously displayed picture and with the capability of generating a derived MPEG video stream can be made to exactly reproduce the state of the MPEG player when playing any given frame of video.

In normal forward play of an MPEG video stream, the decoder retains information from the most recently displayed reference frame and the next reference frame to be displayed in its past and future buffers respectively. It also retains information from the most recently encountered GOP header and sequence header. This information is used to parse and display B-frames and P-frames which are displayed before the reference frame in the future buffer but occur later in bitstream order and is referred to as "state" information for the MPEG Player. Thus there is a difference between display order and bitstream order.

FIG. 4*a* and FIG. 4*b* illustrate typical frame sequences in an MPEG stream. FIG. 4*a* shows the sequence in display order, FIG. 4*b* shows the same sequence in bitstream order. Notice that the reference frames required to decode the intermediately displayed B frames appear before the intermediate B frames in bitstream order. In display order the intermediate B frames appear between the past and future reference frames on which they depend for complete decoding. Thus, each P picture depends on the preceding I or P picture in bitstream order. Of course, where a P picture depends on a previous P picture, that reference picture in turn depends on an earlier reference frame (either P or I). Each B frame depends on the previous two I or P pictures in bitstream order. If these necessary reference pictures are not completely parsed and present in the buffers, the decoder is not in the proper state to completely decode the dependent frames and the P or B pictures which depend on the reference pictures cannot be displayed correctly.

Further, as discussed above, in addition to having the required pictures parsed, decoded and present in the buffers, the relevant GOP header and sequence header information must also be presented to the player before the frames depending on it are parsed. If all of this "state" information is not correct the player will not properly decode the B frames and P frames which occur later in bitstream order. No doubt due to this sequential dependence, the MPEG standard only suggests how to access I frames which can be read and displayed without reference to any other frames.

If one wishes to display an arbitrary frame other than an I frame, the past and future buffers in the player must be placed in the proper state to accurately parse the desired frame. In order to practice the invention, the MPEG player must be capable of accepting MPEG data from a memory buffer instead of merely from a file, such as found on a video disk or CD. Further, the MPEG player must be capable of executing instructions, according to the invention, requiring the player to parse certain arbitrary sections of the bitstream without updating the display to display the resulting pictures on the screen, leaving the previously displayed picture on the screen and without playing any audio associated with the sections parsed. For the purposes of this disclosure, operation of an MPEG player where updating the display is suppressed is defined as operation of the player in "suppression mode." In the preferred embodiment, when operating in the suppression mode the MPEG player ignores the nominal picture rate of the stream and decodes the frames presented as quickly as possible.

Many existing hardware players are capable of executing instructions according to the invention and operating in suppression mode. An example of a hardware player which is capable of executing the process of the invention with its current drivers is the Jakarta MPEG Video Graphics Accelerator sold by Jazz Multimedia, Santa Clara, Calif. Applicants know of only one software player having the required capabilities—the "SoftMotion" MPEG player distributed by SAS Institute of Cary, N.C. While there has been little need for players able to perform this function prior to the current invention, the knowledge required to create such a player is well known in the art and will not be further discussed herein.

Any frame in a bitstream will be properly parsed and displayed if the decoder is in the proper state to parse and display it. In ordinary play, the bitstream order of the frames, GOP headers and sequence headers automatically place the player in the proper state. In its preferred embodiment, the method of the invention accomplishes the task of placing the MPEG player in the proper state to display an arbitrary "target" frame by using a previously constructed MPEG stream index as described above and illustrated in FIG. 3. While such data could easily be obtained from the MPEG video stream or from an array constructed during runtime, the use of a pre-constructed array reduces processing time.

When a target frame is selected for access, according to the preferred embodiment of the method of the invention the index is analyzed to determine which I and P frames must be parsed prior to the parsing of the target frame in order to place the player in the proper state for parsing the target frame. Once this is determined, the player is directed to parse these I and P frames while in suppression mode. Then the picture display and audio are enabled. Finally, the MPEG player is directed to begin playing in the ordinary forward mode at the target location.

While the technique described assumes a video-only MPEG stream, it works equally well in multiplexed MPEG system streams which combine one or more multiplexed video and audio streams. In such cases a de-multiplexer is used to create a single video stream. The index is created from such single video stream rather than from the multiplexed system stream.

The process of frame specific access is easier to understand if specific examples are provided. For the purpose of the following examples, assume the video stream represented in FIG. 4a. The top row of FIG. 4a shows the picture type, either I, B or P. The second row provides the picture display order. FIG. 4b shows the same video stream in bitstream order.

As previously discussed, each P picture depends on the preceding I or P picture in bitstream order or in display order. Therefore, in normal play I and P pictures are always parsed and displayed in the same order. Thus the position of I and P pictures relative to each other does not change from display order to bitstream order.

Notice by comparing FIG. 4a and FIG. 4b that the only difference between display order and bitstream order is the location of the B frames relative to the I and P frames on which they depend. In bitstream order both the past and future reference I or P frames are placed before the depending B frames. In display order B frames are displayed after the reference (I or P) frame on which they depend for a past reference and before the reference (I or P) frame on which they depend for the future reference. As the parser must have access to the information in both the past and future reference frames to properly decode these B frames, both reference frames appear before the depending B frames in bitstream order. They are parsed and read into the appropriate buffer within the player so that they are available to reconstruct the B frames.

In normal play an I or P frame is parsed and placed in the forward buffer. If the frame is a P frame, the parsing includes references to the preceding P frame or I frame which is present in the past buffer. Any B frames preceding the I or P frame and depending on it are then parsed and displayed. The I or P frame is then also displayed as it is read into the past buffer. The next I or P frame is then parsed and read into the forward buffer. The process then repeats itself through the entire video stream.

In order to provide frame specific access to an arbitrary target frame other than an I frame, the necessary reference frames must be properly parsed and residing in the appropriate buffer in order for the player to be in the proper state to parse the target frame. If the appropriate frames are not parsed and read into the appropriate player buffers, the P or B picture cannot be parsed and displayed correctly. Where the target frame is an I frame the display still must be disabled while seeking to the appropriate frame. Further, as I and P frames are not displayed until they are replaced in the future buffer by the next reference frame, the next reference frame must be placed in the future buffer in order to display the target frame.

After it decides the list of frames which must be parsed in order to parse the target frame, the MPEG streamer must construct a virtual MPEG stream out of the correct components of the original stream. The virtual stream will be sent to the MPEG player to reproduce the correct system state. For the MPEG streamer to create a correct virtual stream, it may need more information than just the picture data. MPEG player state information can be modified by MPEG sequence headers and by MPEG GOP headers.

Where the technique is being used to access a specific frame in a video stream where state information is being altered from GOP header to GOP header and from sequence header to sequence header, the streamer performs the following steps:

For each frame that is on the list to be parsed, determine which sequence header and which GOP header apply to that frame. If the sequence header and/or GOP header of the first picture are different from the last ones the player decoded, the different header must be copied in before the data for the first picture it applies to. For all pictures after the first, the sequence header and/or GOP header must be inserted if it is different from the one that applies to the preceding picture in the virtual stream.

While this step is technically necessary according to the MPEG standard, in practice we have found that virtually no streams actually use sequence headers and GOP headers to change player state. Thus, as long as we are merely changing the file position within the same stream, the preferred implementation does not insert sequence headers or GOP headers.

The following examples use the above described video stream to illustrate frame specific access to B, P and I frames according to the method of the invention. The following illustrated examples are illustrations of the preferred embodiment and do not contain the extra steps necessary to insert sequence headers or GOP headers into the virtual stream.

EXAMPLE 1

Frame Specific Access to a B Frame

Figure 5:
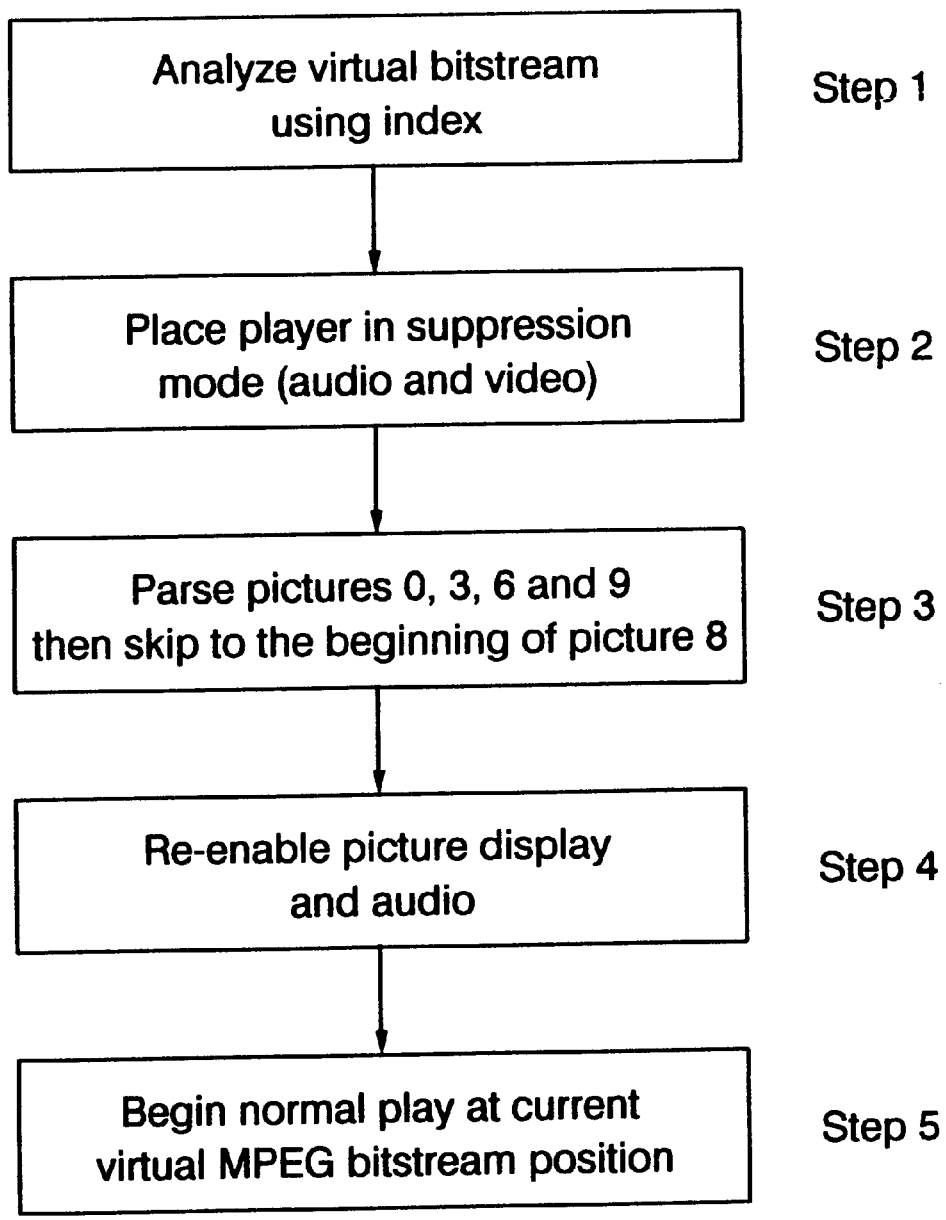
FIG. 5 is a process flow diagram showing the process of a preferred embodiment of the present invention for frame specific access to a B frame in the video stream of FIG. 4.

FIG. 5 shows the preferred process of the current invention used to access the video stream of FIG. 4 at picture 8. The first step in the process illustrated in FIG. 5 is to analyze the bitstream. The identity of the target frame is determined preferably by using the index. We see that picture 8 is a B frame. Once the streamer determines that the target frame is a B frame, the index is further analyzed to determine the location in the video bitstream of the reference frames on which the B frame depends. The target frame number 8 depends on the two preceding I or P pictures in bitstream order. In the example, these pictures are pictures 9 and 6. Thus, pictures 9 and 6 must be parsed correctly and resident in the appropriate buffers for frame 8 to be parsed. Also since picture 6 is a P frame, we must first parse the preceding I frame to correctly parse picture 6. Therefore, we must parse pictures 0, 3, 6, and 9 before attempting to parse and play picture 8.

The second step in the FIG. 5 process is to place the player in suppression mode.

In the third step, the MPEG streamer creates a virtual video stream containing these reference frames pictures 0, 3, 6 and 9 in the proper order and sends them to the player for parsing. Of course, if GOP header and sequence header information was important for accurate parsing, these headers would also be sent to the decoder at the proper time. The streamer then skips to the beginning of picture 8. Note that this sequence does not require skipping backward.

The fourth step in the process is to take the player out of suppression mode, re-enabling the picture display and audio.

Finally, the MPEG player begins normal play at the current file position.

EXAMPLE 2

Frame Specific Access to a P Frame

Figure 6:
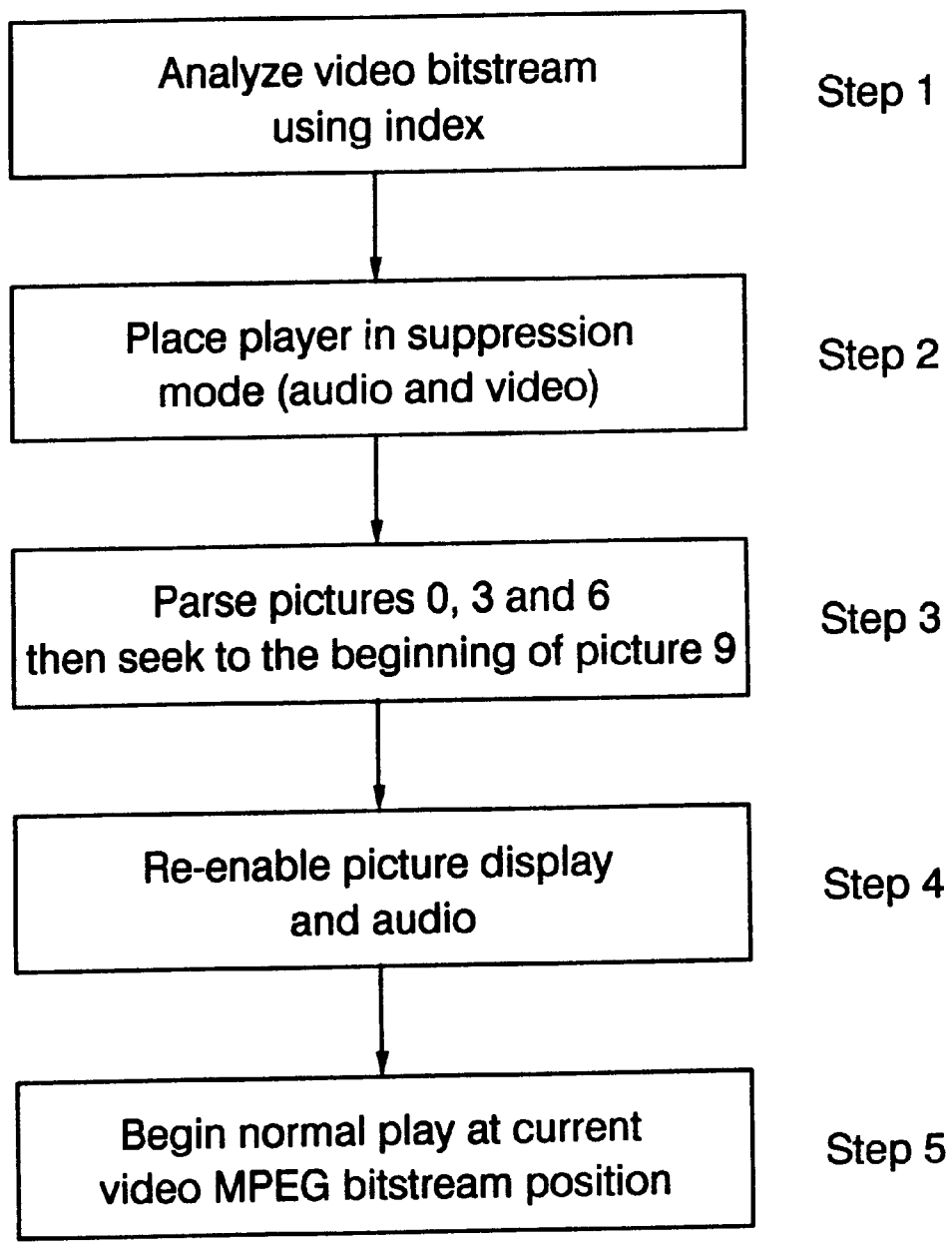
FIG. 6 is a process flow diagram showing the process of a preferred embodiment of the present invention for frame specific access to a P frame in the video stream of FIG. 4.

FIG. 6 illustrates the preferred process for frame specific access to a reference frame (I or P frame). Notice that the process is slightly different than that for a B frame. One reason for the difference is that some of the B frames which would appear before the reference frame in display order occur after the reference picture in bitstream order. Thus "normal" play cannot be achieved immediately after parsing the desired reference frame. The process of the invention uses the analysis obtained from the index to direct the player to skip these dependent B pictures which follow the target reference frame in bitstream order. Since I and P frames are not displayed immediately upon parsing, but are held in the future and/or past buffers until their appropriate place in the display order, we can parse the target reference frame itself while the display is in suppression mode, then seek the frame to the next reference frame after the target frame to skip the B pictures which are before the target frame in display order but after the target frame in bitstream order.

Using the video stream of FIG. 4, FIG. 6 illustrates the preferred process of the invention for frame specific access to picture 6:

Again, the first step is to analyze the bitstream. In the preferred embodiment this step is accomplished at greater speed by referring to the preconstructed index. From the analysis we see that picture 6, the target frame, is a P frame, so it depends on the preceding I or P frame in bitstream order. Therefore picture 3 must be parsed correctly in order for picture 6 to be properly parsed. In addition, as picture 3 is also a P frame requiring picture 0, picture 0 must also be parsed. Since picture 6 is a reference frame, we will need to parse it before re-enabling the display. We also note that the reference picture following the target frame is picture 9. Once the streamer, using the index, determines the list of necessary pictures, it can also determine which GOP and sequence headers will be required at which points in the bitstream, if the MPEG stream is using these headers to convey state information to the player.

The second step is to place the player in suppression mode.

The third step is to parse pictures 0, 3 and 6 while the player is in suppression mode, then to seek to the beginning of picture 9.

The fourth step is to take the player out of suppression mode by re-enabling picture display and audio.

Finally, begin normal play at the current file position. When the player encounters picture 9, it will put picture 6 on the screen as it is moved to the past buffer and hold picture 9 in the future buffer for later display.

EXAMPLE 3

Frame Specific Access to an I Frame

Figure 7:
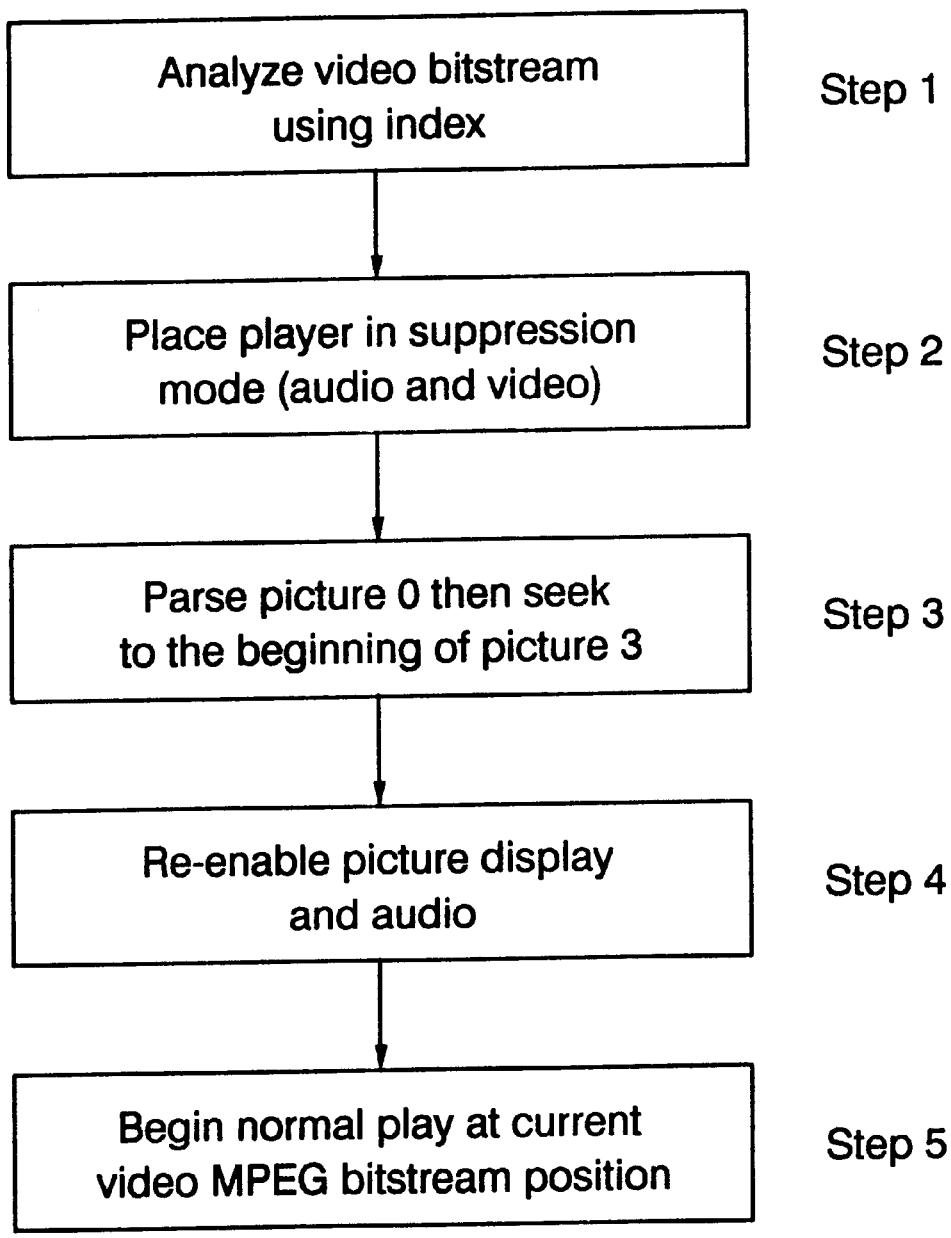
FIG. 7 is a process flow diagram showing the process of a preferred embodiment of the present invention for frame specific access to an I frame in the video stream of FIG. 4.

FIG. 7 illustrates the preferred embodiment of the present invention to access an I frame. Using the same video stream shown in FIG. 4 as do the previous examples to illustrate the steps required to access picture 0 (an I frame).

The first step is to use the pre-constructed index to analyze the bitstream. Picture 0 is an I frame, so it does not depend on other frames. As the preferred embodiment uses an MPEG stream which does not convey state information to the player using sequence headers or GOP headers, the steps related to such headers, discussed above, do not need to be performed.

The second step is to place the player in suppression mode.

The third step is to parse picture 0, then seek to the beginning of picture 3 while the player remains in the suppression mode. In this particular stream, this action does nothing since pictures 0 and 3 are adjacent in bitstream order, but in other streams there may be B frames that are displayed before picture 0 that occur after picture 0 in the bitstream. In such a case the streamer would seek to the beginning of picture 3.

The fourth step is to take the player out of suppression mode by re-enabling the picture display and audio.

Finally, the last step is to begin normal play at the current file position.

While the process actually carried out to perform frame specific access according to the invention varies depending on the type of picture sought, the logic is consistent. This logic is shown on the flow chart of FIG. 8.

Figure 8:
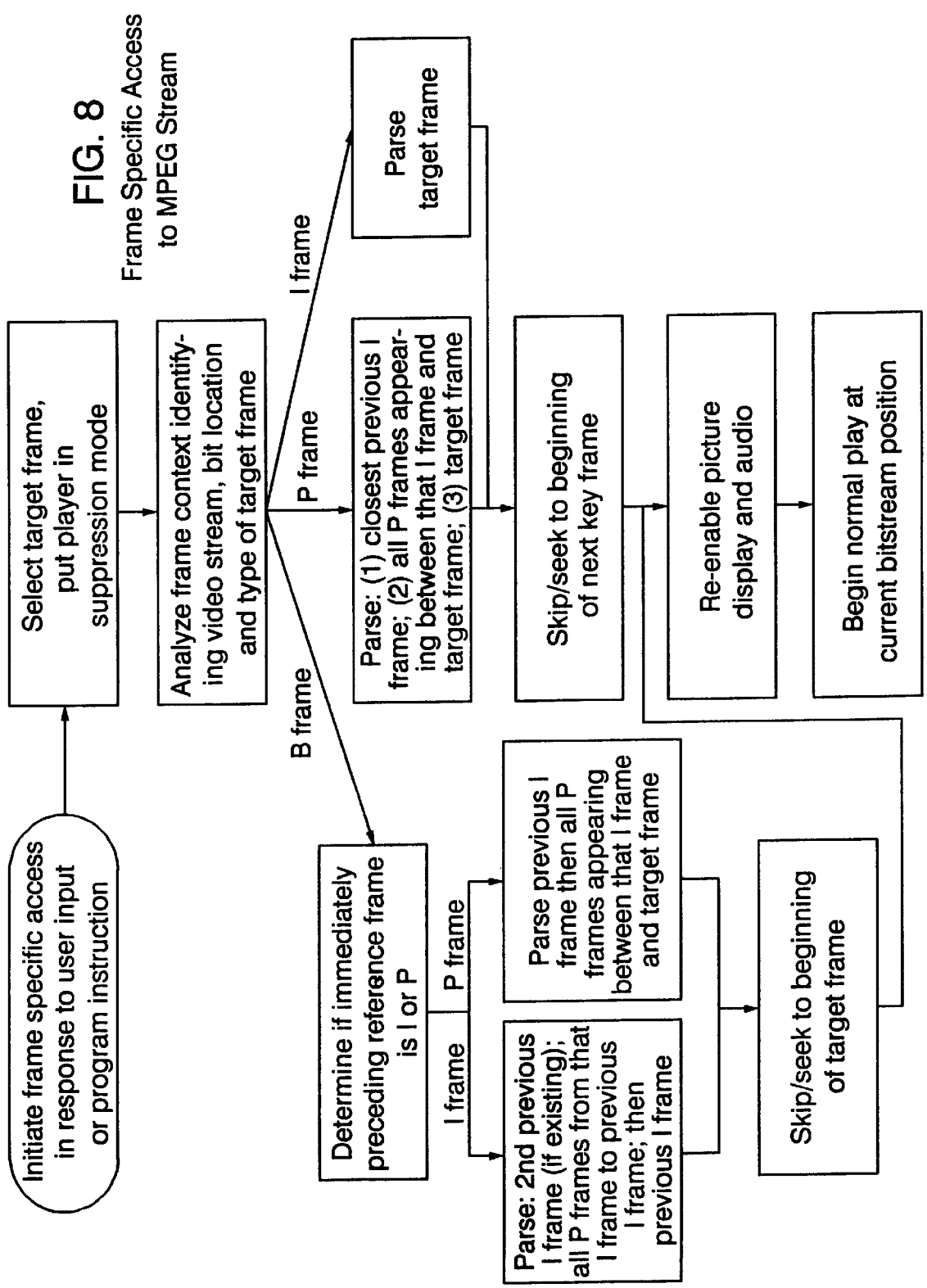
FIG. 8 is a generalized flow diagram showing the process of frame specific access to a specific frame.

As shown in FIG. 8, the overall process is initiated in response to user input or program instruction. For example, in a computer game the user may "click" on a particular area of the screen within the current video frame being displayed. A click in this area may direct the program to begin playing a video stream at a particular location within the stream. This instruction will then cause the system to select a particular target frame in the video stream to be accessed (either the same video stream or another video stream). In response to the same "click" the system also puts the player in suppression mode and analyzes the target frame context. In the preferred embodiment, the system accesses a preconstructed index such as that illustrated in FIG. 3. This index allows the system to determine the location of the target frame within the target video stream, whether the target frame is I, P or B and, if the target frame is B or P, which reference frames must be parsed to place the player in the appropriate state to play the target frame. FIG. 8 then shows, once the target frame type and location is identified, the process branches into three alternatives, which instruct the system how to get the MPEG player in the proper state for the three possible types of target frames. The specific instructions are then carried out as described above and in FIG. 8, using, in the preferred embodiment, the MPEG streamer to locate and read the appropriate frames into the streamer buffer in the appropriate order to be fed by the streamer to the player while the player is in suppression mode.

Once the player is placed in the proper state, the display and audio are enabled and the system begins normal play at its current position. As the three alternatives in FIG. 8 illustrate, the bitstream position varies depending on the type of target frame. For B frames the MPEG streamer is directed to skip or seek to the beginning of the target B frame once the preceding (in bitstream order) reference frames are parsed. Then the display is enabled and normal play is began. As B frames are displayed immediately as parsed, the B frame will be parsed and displayed immediately upon resumption of normal play. The appropriate I and P frames necessary to place the player in the appropriate state to accurately parse the B frame will have already been parsed into the appropriate buffers so that, once normal play is resumed, the B frame will be displayed as it is parsed.

Under normal MPEG player playing conditions reference frames, either I or P, will not be displayed when initially parsed. Rather, reference frames are first parsed into the future buffer where they are used, along with the reference frame in the past buffer, to decode any intermediate B frames. The reference frame is not displayed until another reference frame is parsed into the future buffer, forcing the parsed reference frame into the past buffer and simultaneously displaying it.

The current invention takes advantage of this characteristic of MPEG players. Recall that P frames are dependent on the reference frame in the past buffer for accurate decoding. If the frame in the past buffer is a P frame, it in turn is dependent on any previous P frames between it and the closest previous I frame. Therefore, in order to have the past buffer in the proper state to parse the target P frame, the MPEG streamer is directed to skip or seek to the most recent previous I frame which it sends to the player, then it sends in normal order all P frames between the I frame and the target P frame. Of course, if the streamer/player is not capable of skipping, all intermediate frames can be parsed while the player is in suppression mode as the streamer/player combination seeks toward the target frame. The target P frame is then parsed into the future buffer and the player/streamer instructed to skip or seek to the next reference frame. The display is enabled and normal play is resumed at this position. Immediately upon the resumption of normal play, the next reference frame is parsed into the future buffer, forcing the target frame into the past buffer and simultaneously displaying it.

Where the target frame is an I frame, which can be completely parsed without reference to other frames, we do not need to be concerned with the state of the MPEG player's past buffer. The process of the invention merely assures that the I frame is parsed into the future buffer and the streamer/player is poised to parse the next reference frame upon enablement of the display and resumption of normal play. The parsing of the next reference frame upon resumption of normal play will force the target I frame into the past buffer and simultaneously cause it to be displayed.

Reverse Play

ISO 11172-2 is the document defining the MPEG video standard. Appendix D, section 6.7 of this document contains a brief discussion of "Coding at lower picture rates." The standard recommends the use of a B or P picture inserted between other pictures in the stream to duplicate the previously displayed picture. Such B or P pictures would contain only zero motion vectors to the past reference frame, which would be in the player's past buffer. Such pictures essentially duplicate the picture in the past buffer in its entirety. This previously disclosed technique can only be used to duplicate reference frames, not B pictures. Appendix D also suggests encoding a stream at a lower temporal resolution (i.e. fewer pictures per second) and then "padding" the stream with inserted B or P pictures. However, such a stream must be encoded with all reference frames for such padding to work. This is the only use of such duplicator frames in the prior art.

The current invention uses duplicator frames in a novel and non-obvious way to facilitate reverse play and other special effects. Specifically, one technique used in the present invention is the creation of a B picture by the MPEG streamer that contains only zero-motion-vector references to either the past or the future reference picture. Such a past or future duplicator B picture effectively reproduces the picture in the past or future buffer in its entirety. Such B pictures consist of the same bit sequence regardless of the contents of the picture being duplicated. Consequently the same past or future duplicator bit sequence can be used over and over again regardless of the content of the pictures being duplicated.

Duplicator B pictures which reproduce the picture in the past buffer are called past duplicators. Those which reproduce the picture in the future buffer are called future duplicators. The present invention makes use of the uniform property of such duplicators to create novel video effects, such as efficient reverse play.

It is possible to play MPEG video in reverse simply by successively reproducing the state of the player for each frame in the sequence in reverse order. That is, by using the method described above to achieve frame accurate access for each frame in the video in reverse order. While this avoids the need for additional memory requirements which prior art reverse play methods require, it does require a great deal of extra processing overhead. If the frame to be displayed is near the end of a long GOP, the player may have to parse and suppress the display of many pictures to get the desired picture on the screen.

Reverse MPEG can be accomplished with less processing overhead by the following methodology:

1. If the last frame in the sequence to be played in reverse is a B frame, display it using the technique described above for frame specific access to a B frame.

2. If the next frame to be displayed in reverse display order is another B frame, the past and future buffers are already set up correctly. Parse and display the B frame, then repeat this step for the next frame to be displayed.

3. If the frame to be displayed is a P frame or an I frame, skip to the beginning of the GOP and parse but do not display all P and I frames up to and including the frame to be displayed. Then generate a future duplicator B frame, parse it and display it. Go back to step 2.

EXAMPLE 4

Reverse Play of an MPEG Sequence

Figure 9:
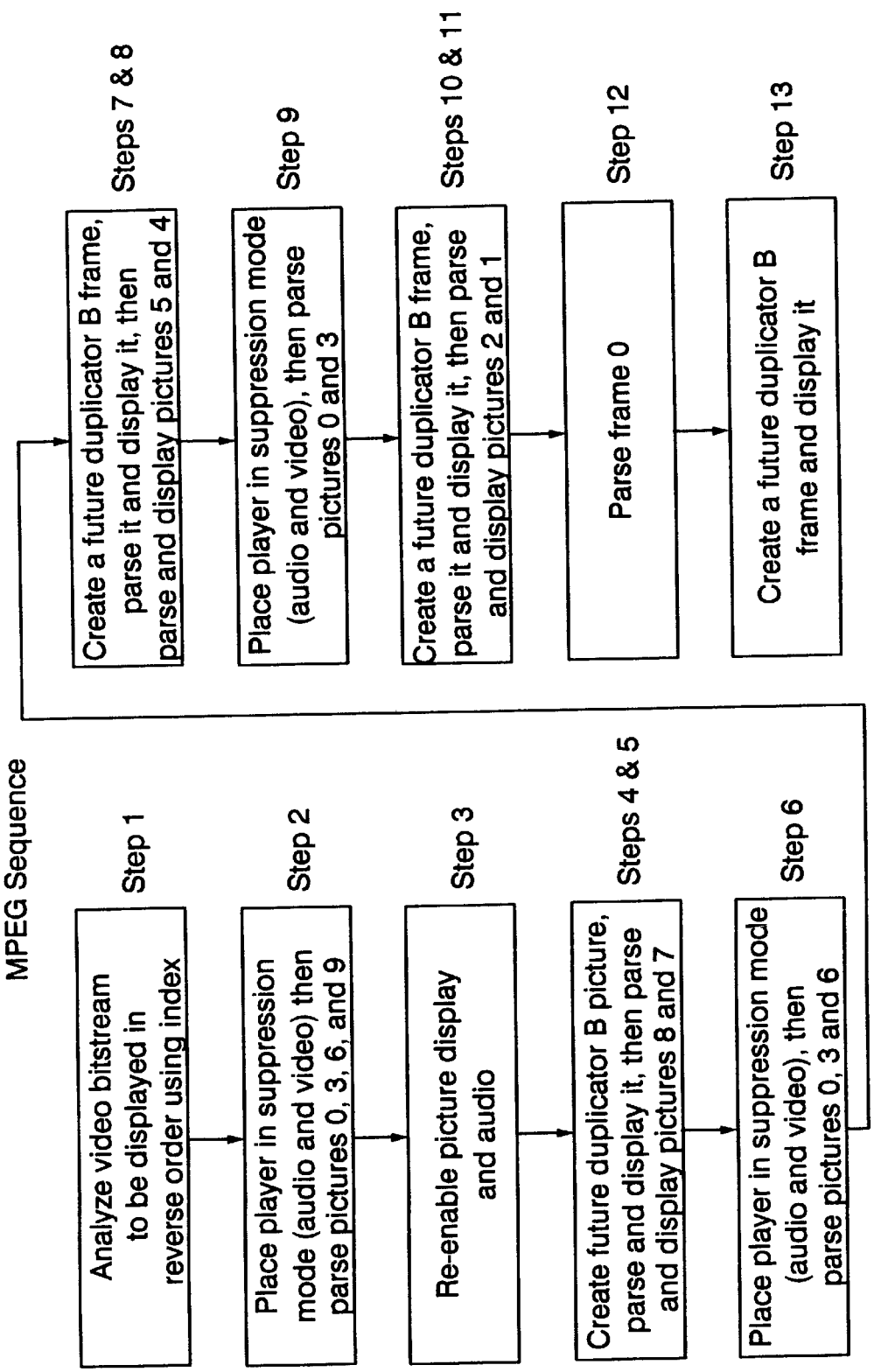
FIG. 9 is a process flow diagram showing the process of a preferred embodiment of the present invention for reverse play of the video stream of FIG. 4.

Using the stream illustrated in FIG. 4, FIG. 9 illustrates the process of a preferred embodiment of the invention for playing the FIG. 4 stream in reverse order.

The first step is to analyze the bitstream to be displayed in reverse order using the index. The analysis reveals that the first frame to be played in reverse order is picture 9, a P frame. The analysis also reveals that in order to place the player in the proper state to parse picture 9 the pictures on which it depends, 0, 3, and 6 must first be parsed.

The second step is to place the player in suppression mode and to parse pictures 0, 3, 6 and 9 while the player remains in suppression mode. This puts frame 6 in the past buffer and picture 9 in the future buffer.

The third step is to take the player out of suppression mode by re-enabling the display and audio.

The fourth step is to create, or retrieve from a buffer, a future duplicator B picture, parse it, and display it. This has the effect of displaying frame 9.

The fifth step is to parse and display pictures 8 and 7, which the analysis revealed to be B frames which depend on picture 9.

The sixth step is to place the player back in suppression mode and to parse pictures 0, 3, and 6 while the player is in suppression mode. This places the player in the proper state to decode pictures 5 and 4 which are B frames but does not display picture 6, a P frame which remains in the future buffer. In order to display picture 6 while keeping the player in the proper state to decode pictures 5 and 4, the seventh step is performed. The seventh step is to create a future duplicator B frame and display it. This has the effect of displaying an exact duplicate of picture 6.

The eighth step is to parse and display pictures 5 and 4, now that picture 6 has been displayed by duplication, although it remains in the future buffer where its presence is required to properly decode B frame pictures 5 and 4. The ninth step is to place the player back in suppression mode and to parse pictures 0 and 3. This places the player in the proper state to decode pictures 1 and 2 which are B frames but does not display picture 3. In order to display the contents of picture 3 without disturbing the future buffer, step 10 is performed. Step 10 is the construction or retrieval from buffer, a future duplicator B frame which is then parsed and displayed. The eleventh step is the parsing and displaying of pictures 2 and 1. The twelfth step is the parsing of picture 0. However, as picture 0 is an I frame, it will not be displayed unless another reference frame is decoded to display it as it moves from the future buffer to the past buffer. The thirteenth and final step is to display the contents of picture 0 by creating or retrieving a future duplicator B frame and displaying it while picture 0 is in the future buffer.

This technique can be used regardless of where GOP boundaries fall. However, where GOP header and sequence headers are employed in the parent video stream to convey changing state information to the player, such headers must be copied into the virtual MPEG stream along with the frames to which they apply.

Synthetic MPEG Transitions and Special Effects

The current invention also uses duplicator frames in a further novel and non-obvious way to create a meaningful transition from one video stream to another. The method requires two video frames, a "FROM" frame, which must be either an I or P frame of the pre-transition video stream and must be in the player's "future" buffer; and a "TO" frame which must be an I frame and is either the first frame to be decoded from the "TO" video stream or an I frame which duplicates the contents of this frame, such as one stored in a separate TO frame cache. Note that the requirement that the TO frame be an I frame does not require the target frame in the parent video stream to be an I frame. If the target frame in the TO video stream is not an I frame it can still function as the TO frame provided the I frame duplicate of the TO frame is in the TO buffer. As such frames are preferably selected during the creation of the program when allowable transitions are identified, the recoding of the required TO frames into I frames is trivial.

It is also within the present invention to avoid the restrictions that the FROM frame be an I or P frame and that the TO frame be an I frame by using a decoder which is capable of treating the decoded data of a non-reference frame as if it had come from an I or P frame. To avoid the need to use reference frames for FROM frames or I frames for TO frames, one must use a decoder able to copy the decoded data from the non-reference frame being used as a FROM frame directly into the past or future buffer and able to copy the decoded data from the P frame or non-reference frame being used as a TO frame directly into the future buffer. Where such a decoder is used a transition according to the invention can be initiated from any FROM frame to any TO frame regardless of the frame type. The first step of such a transition would be to copy the decoded information from the displayed FROM frame into the future buffer at the beginning of the transition. If the TO frame being used is an I frame the transition can proceed normally with the TO frame being decoded into the future buffer forcing the FROM frame into the past buffer. Of course, the decoder could also be directed to copy the FROM frame directly into the past buffer rather than using the TO frame to force it into the past buffer as would happen in ordinary play. Using a non-reference frame for the FROM frame with a decoder capable of this manipulation does not create any additional computational burdens on the system, however use of TO frames other than I frames does. The TO frame must be decoded and the decoded frame information copied into the future buffer.

Unlike the case for a FROM frame where such decoding will be accomplished in the ordinary decoding and playing of the FROM video stream prior to the transition, the use of a TO frame other than an I frame will require the system to first accurately decode the desired TO frame before it can be copied into the future buffer. Thus, the system will be required at a minimum to parse all the reference frames upon which the TO frame depends in order to properly decode it. The frame specific access technique disclosed herein could be employed to achieve the proper decoding of the TO frame. While this would allow for transitions to any frame as a TO frame, such flexibility would come at the cost of additional seek and computation time while the frame specific access technique was being executed. Thus, in the preferred embodiment the TO frames are I frames, either through the use of cached I frame duplicates of the TO frames or through restricting transitions to TO frames in the TO stream which are coded as I frames.

In the preferred embodiment, the transition is used not only to provide a meaningful transition from one video stream to the other or from one part of a stream to another part of the same stream by providing visual cues as to the direction of the transition thereby helping the viewer maintain orientation within the video environment, but also to provide such meaningful transition information during the time when the computer is seeking the TO video stream. However, the transition technique of the present invention can be used for either one of these purposes or for both. The example provided below employs the processes required to perform both functions, although it is understood that both functions are not necessary to practice the invention and the use of synthetic MPEG as disclosed herein is within the scope of the invention whether or not coupled with use of visually meaningful orientation cues and whether or not used to mask seeking time.

The video and film industry has used many transitions in the prior art, and many of these can be accomplished using the above technique. For the specific purpose of navigating through a videotaped environment, however, the two most important transitions are what we will call the "push left" and the "push right" transitions. In a push left, the TO picture enters the screen from the left and pushes the FROM picture off the right-hand side. This appears to the user as if he had turned to the left. In a push right, the TO picture enters the screen from the right and pushes the FROM picture off the left-hand side. This appears to the user as if he had turned to the right. If care is taken when shooting the source video, the edges of the FROM and TO frames will be a close match, enhancing the appearance of turning. Similar transitions can be accomplished for "push up", "push down" and other common and uncommon transitional techniques present in the digital and analog prior art.

According to the preferred embodiment of the present invention, the MPEG streamer of the multimedia product has an additional buffer in which are maintained I frames corresponding to the TO frames which the run-time system would seek for each possible transition which the user might initiate from that point of the video environment. For example, if the environment was a department store interior, the buffered frames might be left view, right view, and 180 degree turn midway on a department store aisle and might include left turn, right turn and 180 degree turn at the intersection of two aisles. FIG. 2 illustrates an embodiment containing such a TO frame buffer. In order to reduce memory requirements and access time, the contents of the TO frame buffer may change from time to time depending on the location of the user within the video environment. Alternatively, the transition can be performed after the TO frame is located in the target video stream sequence where the entire sequence is stored.

A system according to the invention is illustrated in FIG. 2. This illustration shows the preferred embodiment containing a dynamic TO frame buffer 27. The embodiment illustrated in FIG. 2 also has a pre-constructed group of synthetic MPEG transition streams 29 (FIG. 2) which can be readily accessed to provide the desired push left, push right or other enabled transition effect. FIG. 2 also illustrates use of a transition generator 31 which can be employed to create the desired synthetic MPEG stream on-the-fly. The method of the invention can be practiced with either or both a pre-constructed synthetic MPEG transition buffer or a generator.

The Push Transition

The transition methods of the invention are useful whether or not they are used to mask seek time. Where seek time masking is not desired, the TO frame buffer can be eliminated and the TO frame sought directly from the target video stream. Whether the TO frame comes from the additional buffer or is copied from the actual TO frame, the streamer inserts the TO frame into the stream and causes the player to parse it. This forces the FROM frame onto the screen.

The player has now set up a situation in which the FROM frame is in the past buffer and the TO frame is in the future buffer. The streamer can generate a series of B frames, all of which refer to either the FROM frame, the TO frame, or both, which appears to the user, when played, as if a transition is occurring.

Figure 10:
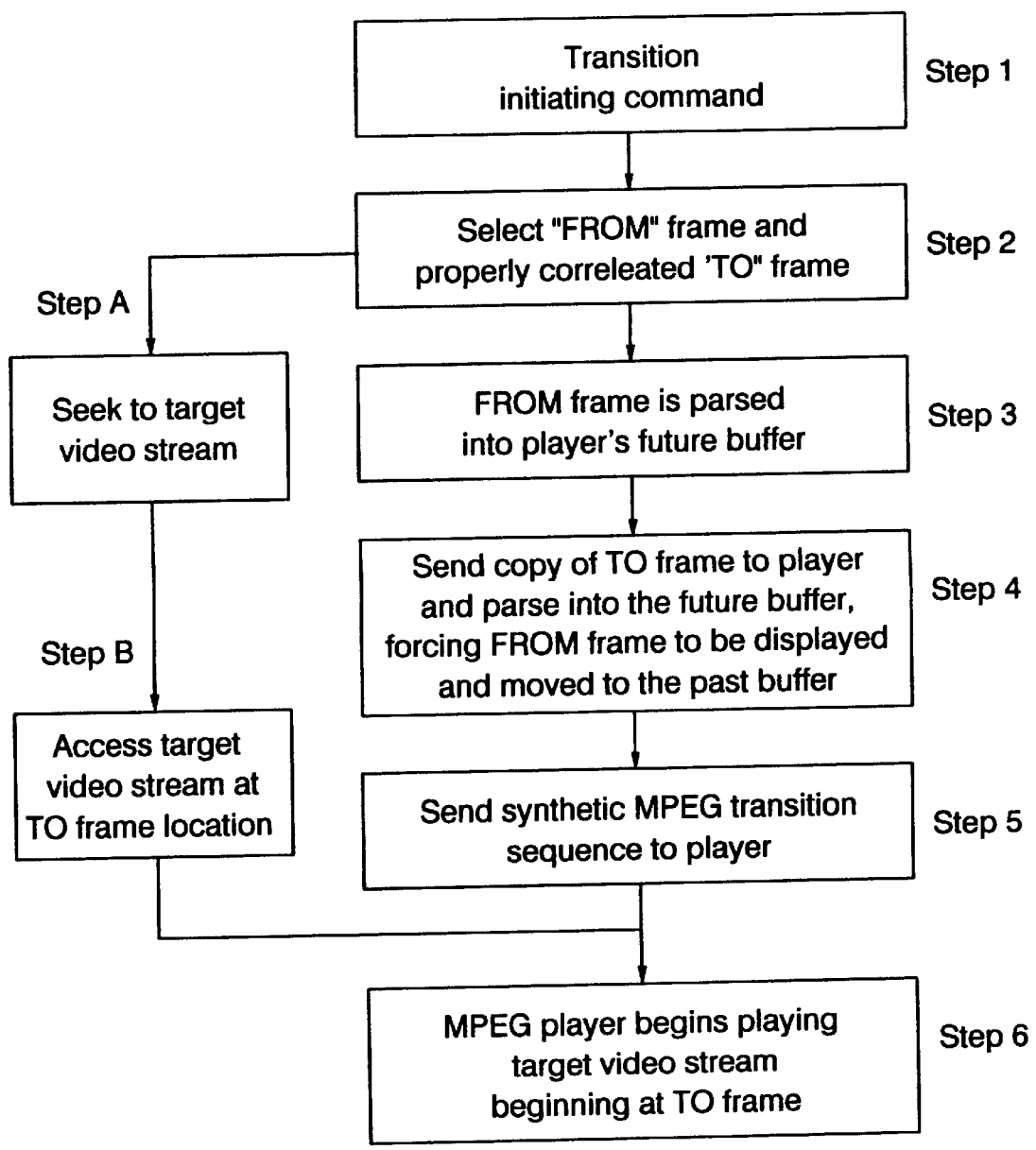
FIG. 10 is a process flow diagram showing the process of a preferred embodiment of the invention for transition from one video stream to another.

The transition process is illustrated in the process flow diagram of FIG. 10. For the purposes of this illustration, assume the user of a multimedia software product is "navigating" along a path in a video environment which path is represented by a single MPEG stream and the user wishes to turn to the right at an intersection in the video environment being displayed by the computer and proceed in this new direction. Assume further that the view to the right and the navigable path to the right is contained on a second video stream here called the target stream. It could just as easily be contained on a remote area of the first video stream.

In the first step of the push right transition illustrated in FIG. 10, the user by means of any input device executes the appropriate navigational command which is recognized by the computer to require a push right transition to the target video stream at the TO frame. As the preferred embodiment of the invention uses a transition frame cache or buffer, only selected, matched frames may be used for transitions. Therefore, upon receiving the push right instruction, in step two of the process the MPEG streamer continues to play the current FROM video stream until it encounters the next FROM frame in the stream for which a push right TO frame is correlated. Such a frame may simply provide a view of a side wall or inaccessible portion of the environment, in which case no target video stream is sought, merely cached "side view" frames. However, in this illustration, the system indicates the availability of a path to the right, therefore, there is not only a cached "right view" TO frame, but such TO frame also represents an entry point on a target video stream. Therefore, step two leads not only to step three where the FROM frame is sent to the MPEG player by the MPEG streamer, but also to steps A and B where, simultaneously, the streamer seeks the target video stream on the video stream storage media. Steps A and B can be further facilitated by use of a pre-constructed video stream index 33 (FIG. 2).

While the seeking steps are being performed, the streamer sends the appropriate TO frame from the TO frame buffer 27 (FIG. 2) to the player where it is parsed into the future buffer forcing the FROM frame into the past buffer as shown in step four of FIG. 10. The MPEG streamer then either retrieves the appropriate pre-constructed synthetic MPEG transition stream from the transition buffer 29 (FIG. 2) or employs the transition generator 31 (FIG. 2) to create the appropriate synthetic MPEG stream on-the-fly as illustrated in step five of FIG. 10. The construction and function of the synthetic MPEG stream is discussed in more detail below. As the last of the synthetic MPEG frames reach the player and the transition is completed, the seek function will also be completed and the player can resume normal play at the new position in the TO video stream. Note that if the TO frame is not an I frame it must be converted to an I frame using standard MPEG decoding/encoding steps before it can be injected into the TO frame cache. The actual target frame will remain unaltered, but its representation in the cache will be as an I frame.

Construction of Synthetic MPEG for use with the Push Transition.

The synthetic MPEG which is sent to the player from the transition buffer or transition generator to create the push right transition desired by the user is performed by generating a series of B frames. Each macroblock in the generated B frames refers to either the picture in the future buffer or the picture in the past buffer. The first frame in the series contains mostly references to the past buffer, but all macroblocks referring to the past buffer use a motion vector that copies the macroblock in the FROM frame that is in the same row, but in the next column to the right. The last column of macroblocks use a motion vector that copies the macroblock in the TO frame that is in the same row, but in the first column. This results in a picture that consists mostly of the FROM picture, but shifted to the left, and a small amount of the TO picture. Succeeding pictures repeat the process, gradually shifting more of the FROM picture off the left edge of the screen and more of the TO picture onto the screen, until only one column remains of the FROM picture. At this point, the streamer would initiate frame accurate access to the TO frame in the TO video stream, causing the player to perform the functions illustrated above to place itself in the appropriate state to play the target TO frame. Normal forward play can then be resumed, with the decoder now decoding pictures from the new stream or position. Since the streamer does not refer to any MPEG streams "on disk" while generating and displaying the transition synthetic MPEG, it is free to issue an asynchronous seek command to the storage device containing the MPEG streams immediately after receiving the turn command.

This process is illustrated in FIG. 11, subparts a through k. Assume that the FROM picture is picture F and the TO picture is picture T. Assume further that each picture is 10 macroblocks wide and 7 macroblocks high (160×112) for purposes of illustration, although the technique applies to any size picture. FIG. 11a labels each macroblock in the FROM picture with a code consisting of the letter of that picture, a digit indicating the row of the macroblock, and a digit indicating the column of the macroblock. FIG. 11b does the same for the TO picture. FIG. 11c through FIG. 11k show the contents of the intermediate B frames that would be generated to display a push right transition from frame A to frame B. Note that in the push right transition, all motion vectors are an even multiple of 16 pels, meaning that an exact copy of a macroblock in either the FROM picture or the TO picture is placed in each macroblock of the intermediate pictures.

Figure 12:
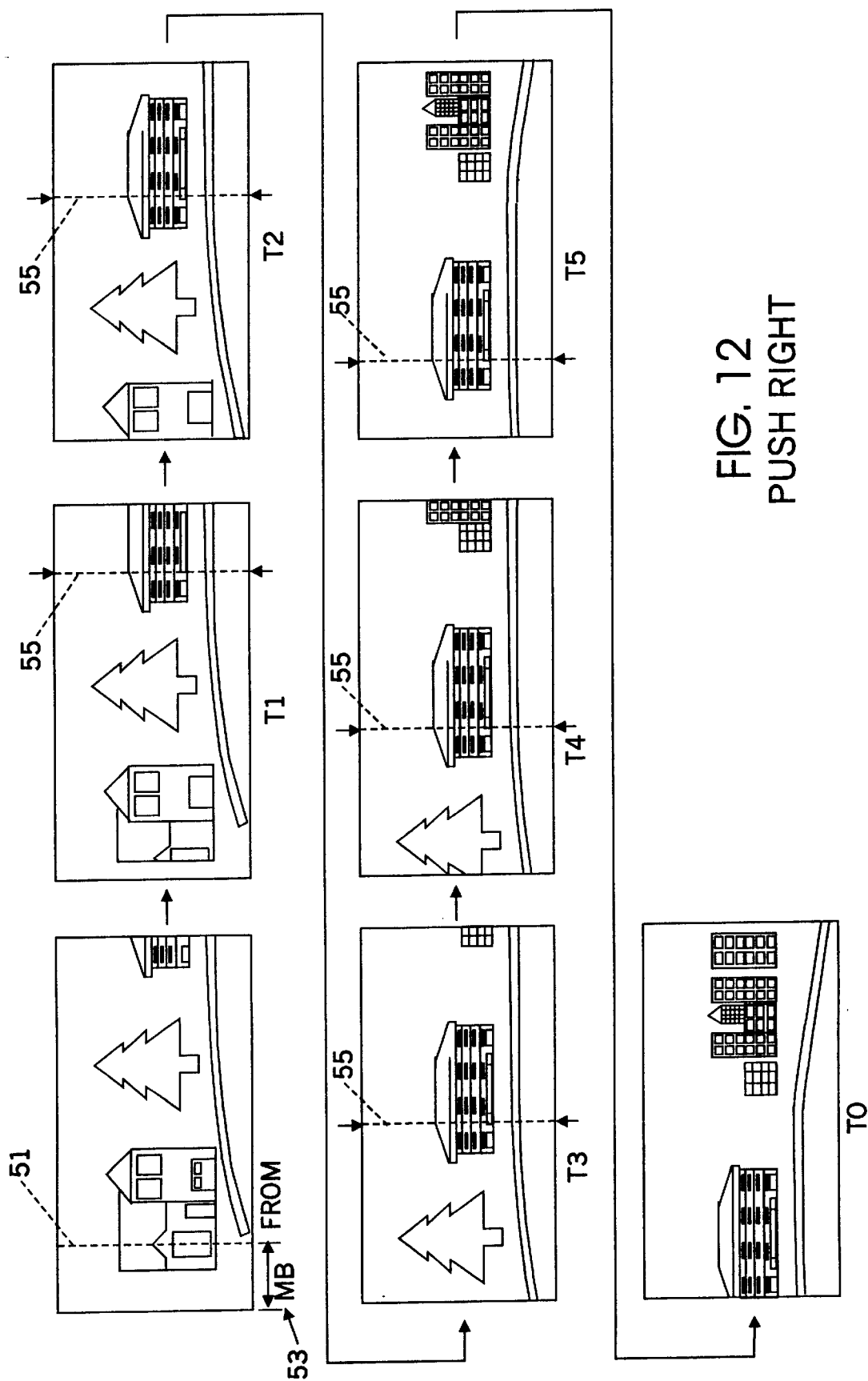
FIG. 12 is an illustration of the appearance of successive displays during a push right transition.

FIG. 12 shows an illustration of a push right transition according to the invention as it would appear in the display. In FIG. 12, the pictures illustrated are assumed to be only 6 macroblocks wide, although in actuality a 16 pel macroblock width increment would be substantially smaller than that illustrated. Further, in FIG. 12 illustration the display is assumed to coincide with the bitmap of the picture. That is, it is assumed that there are no undisplayed portions of the picture. The transition works equally well where the picture display is less that the entire bitmap. Further, transitions can be improved if the player used has the ability to "pan" the bitmap. This process is discussed in detail below in the Turn Transition section.

At the top left of FIG. 12 the FROM frame is shown. The width of a column of macroblocks is illustrated by a dotted line 51 extending vertically through the FROM picture of FIG. 13. This width is denoted to be one macroblock column (16 pels) by the MB measurement shown 53. The right margin of the FROM picture is depicted in pictures T1 through T5 of FIG. 12 by a vertical line 55. Pictures T1 through T5 are sequential transition pictures generated according to the push right embodiment of the invention. T1 contains all of the macroblock columns of the FROM picture except for the one to the farthest left. The leftmost column of T1 is the macroblock column which was second from the leftmost in the FROM picture. T1 also contains as its farthest right macroblock column the farthest left column of macroblocks from the TO Picture. Similarly, T2 contains all of the macroblocks of the FROM picture except for the two columns farthest to the left with the macroblock column which was third from the left in the FROM picture as the leftmost column of T2. T2 contains the leftmost two macroblock columns of the TO picture as its rightmost two columns. The successive transitional pictures, T3, T4, and T5, contain increasing numbers of columns of the TO picture and decreasingly fewer columns of macroblocks from the FROM picture until T5 which contains only the right most column of the FROM picture as its leftmost column and contains all columns of the TO picture except for the right most. When played sequentially between a FROM picture and a TO picture whose borders are well aligned, the effect of this transition is a pan to the right.

The speed of the transition can be varied by use of repeated transition frames. Further, the speed of the transition does not have to be constant. Use of varying numbers of repeated frames can create the illusion of acceleration or deceleration in turn speed. Use of this embodiment of the invention does have a minimum transition increment, however. The smallest increment of change from transition to transition is the macroblock. Thus in a push right transition, a row of macroblocks is the smallest incremental change from picture to picture.

Transitions are not limited to push rights and push lefts. Indeed, many transition effects can be generated since any of the macroblocks in the intermediate frames can display any 16×16 pel region in the FROM picture, any 16×16 pel region in the TO picture, or, by using both forward and backward motion vectors, the average of any 16×16 pel region in the FROM picture and any other 16×16 pel region in the TO picture.

Note that it is possible for transitions similar to these to be generated in software without the use of an MPEG player or an MPEG stream. Some of these exist in the prior art. In order to create a transition without resort to the present invention, the decoder would need to make the bitmaps of the FROM and TO pictures available to the software, which would then scroll them across the screen in a meaningful way. However, this does require the transition software to be in control with the resulting increase in computational demands. If the transition is done solely as an MPEG stream, as taught in the present invention, any MPEG hardware that is available will be able to run the transition with minimal CPU intervention. If the transition is done in software, rather than utilizing the present invention, the CPU will be quite busy displaying it. If the CPU is less busy performing the transition, it can spend more time anticipating the user's needs and reduce response time to the user's requests.

Note further that the transitions described here are "invariant." In other words, the intermediate sequence of B frames for a given transition, such as a push right, is identical, regardless of the content of the FROM and TO pictures. This has significant advantages at runtime in that it is not necessary to perform laborious calculations or encoding to run the transition; a static block of data can be inserted into the bitstream by the streamer and then fed to the player to implement the transition.

Rather than generating transitions during runtime as described above, the transitions can be performed during editing of a video work and the resulting linear video stream can be stored for future playback. Consequently, the part of the invention dealing with transitions also has application in more traditional linear-style editing of MPEG video. A linear editor traditionally uses cut and paste techniques to create a new video stream out of one or more component streams, possibly with transitions between sections of the component streams. The transition methods of the current invention could be employed to generate smooth transitions between the cut and pasted sequences at edit time and written to the disk as a part of the resulting edited video stream, thus creating a new linear video stream that has the effect of playing the transition. Thus the present invention can be employed in a runtime system to allow a large number of transitions to be accommodated, or can be used to splice video streams or sequences together at edit time.

Turn Transition

One drawback of the push transition described above is that the smallest incremental change from intermediate picture to intermediate picture is a macroblock. If the transition is being performed in video coded to the MPEG-1 standard, this means that the smallest unit of change is a 16×16 pel region of the display. While this type of transition is more than adequate for many applications, there are applications where a smoother transition is desired.

The transitions aspect of the present invention can also be used in conjunction with intra-bit map panning to generate a smooth transition. This type of transition is a hybrid of the techniques previously described and existing techniques for panning bitmaps called a "turn" transition. In the preferred embodiment, we are primarily concerned with "turn left" and "turn right" transitions, analogous to "push left" and "push right", but "turn up" and "turn down" would also be possible. Turn transitions are much like push transitions, but can be made to occur much more smoothly than pushes since the from and to images do not have to move in 16-pel increments.

To execute a turn transition, the player must be placed in a mode which displays less than all of the video data in the pictures in the stream. At least a 16 pel column (where the turn transition is to the left or right) or row (where the turn transition is up or down) of video data must be offscreen at all times. This could be accomplished by any means known in the art. For example, pictures larger than the display can be accomplished by "stretching" the remaining pels to fill the onscreen area, or by reducing the size of the onscreen area so that only part of the source video is available.

Furthermore, in order to execute the hybrid "turn" transition, the MPEG player must have the capability of "panning" over the source video. Panning involves mapping a portion of the source video to the onscreen display area, leaving some portion of the source video offscreen. For example, if the pel with X coordinate of 16 and Y coordinate of 0 is onscreen at coordinate 0,0 (the upper left portion of the video display area) and coordinates are increasing down and to the right, the video picture is said to be panned 16 pels right. In this case, 16 pels of source video would be said to be offscreen to the left of the onscreen area. If no pels are offscreen to the left, the video is said to be panned fully left; if no pels are offscreen to the right, it is said to be panned fully right.

Once the player is set up correctly, the streamer executes the turn right by the following steps as illustrated for a right turn transition in FIG. 13:

In the first step the player's past and future buffers are set up as for a push transition as illustrated in FIG. 10, steps 1 through 4. The future buffer should contain a copy of the TO frame, the past buffer should contain a copy of the FROM frame.

In the second step, the streamer or other runtime component decides on the number of pels the FROM and TO frames should appear to move between frames. This number reflects the speed at which the "turn" will be perceived by the viewer of the display. This decision can be made in a variety of ways. For example, the speed of the turn could vary according to the magnitude of the turn command from a user input device, such as a joystick or mouse. In the example of FIG. 13 the display will change at the constant rate of 4 pels per frame. However, it is well within the invention for the speed of the transition to be much less or much more depending on the effect desired. Further, the speed of the transition does not have to be constant. Note also that a variable number could be chosen for each frame to give the impression of accelerating or decelerating during the turn. The system could accelerate or decelerate or both during all or portions of the turn transition.

The third step illustrated in FIG. 13 requires the player to be instructed to pan the video display port to the right such that, at the end of the series of pans which make up this step, there are fewer than one panning increment's worth of pels of the FROM picture offscreen to the right of the display. This is done iteratively by sending past duplicator B frames to the screen and iteratively adjusting the panning amount by the panning increment. For example, if 80 pels are offscreen to the right when step 3 begins, and if the panning increment is 4, then 20 past duplicator frames will be sent as the picture is panned to the right 4 pels at a time. Notice that the duplicator frames in this panning step refer only to the FROM frame and contain no information from the TO frame.

In the fourth step illustrated in FIG. 13 the streamer determines which pel column of the FROM picture will be the leftmost pel column of the onscreen display area for the next frame by adding the panning increment to the leftmost currently visible pel column which has the effect of shifting the leftmost column to be displayed one panning increment to the right of the leftmost column displayed in the previous picture. Exactly where in the FROM picture this leftmost displayed column will be depends on the relationship between the width of the display port and the width of the picture being displayed. Once this determination is made the streamer constructs or retrieves a composite B which places the macroblock column of the FROM picture which contains the desired pel column in the leftmost macroblock column of the composite B frame. Succeeding columns contain the rest of the FROM picture and the first column(s) of the TO frame. These composite B frames are similar to the ones used in the PUSH transition discussed above.

The fifth step illustrated in FIG. 13 is to send the composite picture to the player while also instructing the player to adjust its panning mode to the left by the amount that the FROM picture was shifted when creating the composite picture minus one panning increment. The onscreen appearance will be that the FROM picture has shifted one panning increment to the left and the onscreen pel columns to the right of the FROM picture contain the first pel columns of the TO picture.

In the sixth step illustrated in FIG. 13 the streamer sends the player another copy of the composite video frame used in step 5, but with a panning instruction which serves to move the display one panning increment (eight pels) to the right. This step is repeated with incremental panning adjustments until the number of pels remaining offscreen on the right side of the picture is less than one panning increment.

The seventh step illustrated in FIG. 13 is designed to determine whether further duplicator B frames must be constructed or retrieved. In the seventh step the MPEG streamer determines which pel column should appear in the leftmost pel column of the visible display area by adding the panning increment to the leftmost currently visible pel column. If this addition results in a leftmost visible pel column which is still in the range of the FROM picture's width, further intermediate B frames must be constructed or retrieved, and the streamer proceeds to step 8. If the resulting pel column would be outside the FROM picture's width, no further frames need be constructed; the TO picture can be used instead, and the streamer proceeds to step 9, which is the last step in the process.

In step eight the streamer determines which macroblock column in the FROM picture contains the pel column that should be on the left-hand edge of the visible portion of the next frame and constructs or retrieves a duplicator B frame with the appropriate past and future buffer references to place this macroblock column in the leftmost macroblock column of the B picture. Succeeding macroblock columns contain the portions of the FROM picture further to the right if any, followed by the first columns of the TO picture. After constructing the intermediate B frame, the streamer proceeds back to step five to display it appropriately.

Once the streamer determines that no more portions of the FROM picture are in the visible display area, normal play is resumed from the TO picture. Note that steps A and B illustrated in FIG. 13 may be executed during the transition to mask seek time so that the TO video stream has been located and is ready to be sent to the streamer at the completion of the transition and the system is ready to accept any other user input available from this position on the TO frame.

Note that in the best mode implementation of the invention the correlated FROM and TO pictures in all transitions, whether "hybrid" panning transitions or pure synthetic MPEG transitions, are visually well matched. For example, in a push right or right turn transition, there is preferably no overlap and no visual gaps between the right edge of the FROM picture and the left edge of the TO picture. Visual elements that span the two pictures should appear normal if the two pictures are displayed adjacent to each other. If video or film is used to create the MPEG video, the camera position must be carefully controlled with respect to its elevation and position. The difference in the camera angles between the two pictures should also be equal to the camera's field of view, to prevent gaps or overlaps. Also, optical or post-production correction techniques may be needed to correct for any optical distortion of the lens at the edges of the picture. These techniques are well known in the art. Most of these problems disappear if computer-generated images are used to generate the MPEG video.

In the preferred embodiment of the system, a camera lens or computerized rendering option is chosen so that a 90 degree field of view is obtained, thus giving the ability to make 90 degree left or right turns conveniently. In this implementation, it is possible to show exactly half of the resulting video, giving an effective 45 degree field of view onscreen. This in turn allows the turn transitions to occur using only one intermediate frame that consists of half of the FROM picture and half of the TO picture. The intermediate frame is repeated multiple times while the panning is adjusted to reveal different portions of it.

It is also important to note that, as is the case in the push transition, in the turn transition the duplicate B frames used to accomplish panning are invariant and independent of picture content. Further, in the preferred embodiment using a 90 degree field of view for the picture and a 45 degree field of view for the display, composite B frames containing references to portions of the FROM picture and to portions of the TO picture used in right turns in the production are also invariant. Consequently, a single sequence of transition B frames, for example, one for use in all right turns, can be either precreated and stored at edit time or generated on-the-fly during runtime.

FIG. 14 illustrates a right turn according to the invention. In FIG. 14 there are two video pictures, picture F, the FROM picture and picture T, the TO picture. These pictures which were derived from actual "shot" scenes or rendered scenes are referred to as video resources to distinguish them from composite pictures created with the use of duplicator B frames according to the invention. These composite pictures are sometimes referred to herein as manufactured resources. For the purposes of this illustration it is assumed that picture F and picture T each measure 704 pels by 240 pels and that the onscreen visible area is 352 pels by 240 pels. It is also assumed that the panning increment is a constant 8 pels, and that the topmost, leftmost pel in a picture is pel 0,0.

To assist in the explanation of the transition in FIG. 14 the pictures are shown divided into two regions. For example, picture F has a left region $F_L$ 206 consisting of the first 352 pel columns of F (columns 0 through 351) and a right region $F_R$ 207 consisting of pel columns 352 through 703. Similarly, picture T has a left region $T_L$ 208 consisting of pel columns 0 through 351 and a right region $T_R$ 209 consisting of the remaining 352 pel columns of the picture. The four subparts of FIG. 14, FIGS. 14a, 14b, 14c and 14d illustrate a right turn transition from F to T.

In FIG. 14 the active video picture, that is, the picture of which a portion is being displayed by the system, is shown by a solid-lined rectangle. Where the active video picture is a video resource 201, the lines of the rectangle are thin. Where the active video picture is a manufactured resource 202, the lines of the rectangle are thick. Where the video picture is inactive, that is not currently being displayed, it is represented by a rectangle outlined by a single, dotted line 204. A double, dotted line is also used to delineate between the left and right regions of a picture 205, whether or not the picture is an active picture.

The onscreen region of the video picture being displayed is shown as a shaded gray area 203. Depending on the circumstances of the turn, the FROM frame could be either a video resource 201 or a manufactured resource 202. In the preferred embodiment, the FROM frame is usually a video resource either taken directly from the video stream being played or taken from a cache of pictures of views which may or may not be not present on a video stream. Of course, if the original FROM picture is not a reference frame it must be converted to a reference frame as discussed above in the section dealing with push transitions.

Figure 14A:
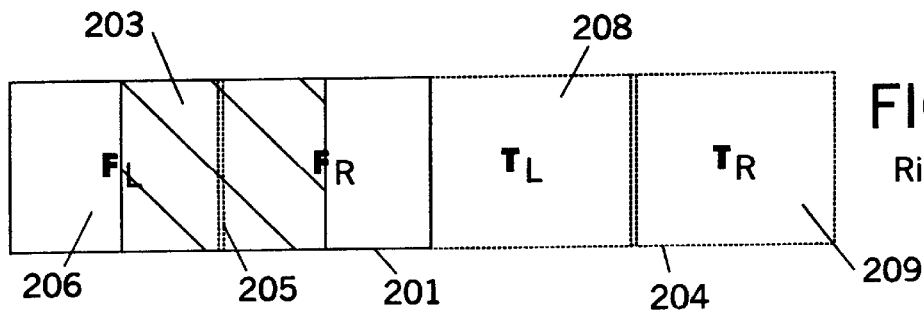
FIG. 14 is an illustration of the relationship of panning the display over the FROM picture, composite picture and TO picture during a right turn transition according to the invention.

FIG. 14a shows the visible portion of the screen 203 before the transition is executed. The middle portion of picture F is being displayed. That is the displayed portion of F consists of the right portion of region $F_L$ 206 and the left portion of region $F_R$ 207 which consists of pel columns 176 through pel column 527 of F. The panning position is therefore 176 pels from the left edge of F. To begin the transition, the streamer must first add the FROM picture to the past buffer and the TO picture to the future buffer by passing them to the MPEG player to parse. Then the streamer generates a series of 22 past duplicator pictures while the panning position is adjusted to the following positions:

184, 192, 200, 208, 216, 224, 232, 240, 248, 256, 264, 272, 280, 288, 296, 304, 312, 320, 328, 336, 344, and 352

Figure 14B:
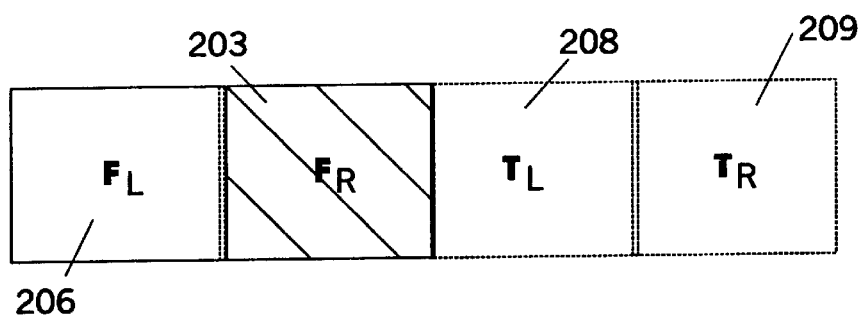

As the twenty-second duplicator is displayed the picture is panned fully to the right, with no pels offscreen on the right. That is the display boundary coincides with the boundaries of $F_R$ and the displayed portion of the picture 203 covers all of $F_R$. This position is shown in FIG. 14b.

The streamer then obtains or creates a composite B picture consisting of the right 352 pel columns of picture F and the left 352 pel columns of picture T made in accordance with the invention. We refer to this composite picture as $F_R T_L$. As it is the active picture in FIG. 14c, it is shown there in a bold rectangle 202. In the preferred embodiment, the leftmost panning increment of $F_R T_L$ will not be displayed, as it duplicates that last display of picture F. The first display of $F_R T_R$ will be one panning increment to the right of the picture's left margin. This is accomplished by the streamer sending picture $F_R T_L$ to the player and simultaneously resetting the panning position such that 8 pels are offscreen on the left and 344 pels are offscreen on the right. The visible appearance is that the portion of picture $F_R F_L$ that was previously visible has shifted left 8 pels and 8 pels of picture $T_L T_R$ are visible on the right edge of the picture. The streamer continues to send copies of $F_R T_L$ to the player while the panning position is adjusted to the following positions:

16, 24, 32, 40, 56, 64, 72, 80, 88, 96, 104, 112, 120, 128, 136, 144, 152, 160, 168, 176, 184, 192, 200, 208, 216, 224, 232, 240, 248, 256, 264, 272, 280, 288, 296, 304, 312, 320, 328, 336, and 344

Figure 14C:
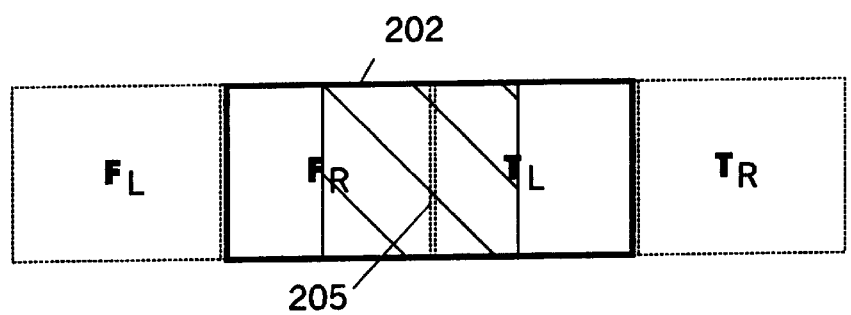
Figure 14D:
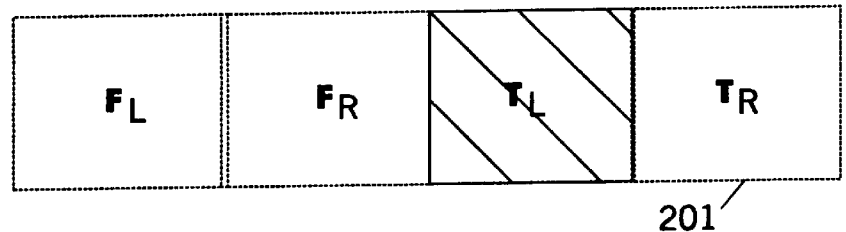

FIG. 14c shows the panning process at the intermediate point where the panning position reaches 176 pels from the right margin of picture $F_R T_L$. When the panning position reaches 344 we have the option of panning one further increment to 352 and direct the player to pan picture $T_L T_R$ 8 pels to the right of the left margin, however we have chosen to cease the pan at the 344 pel position and, preferably using the frame specific access techniques described elsewhere in this disclosure, place the $T_L T_R$ picture on the screen and simultaneously change the panning instruction to the player so that no pels are offscreen to the left. This position is shown in FIG. 14d.

From this point, based on the user's input, we are free to continue panning so that frame $T_L T_R$ is centered, to play video in a forward or backward direction, to execute a further right turn, resulting in a 360 degree turn, to execute a left turn back to $F_L F_R$ (through use of a left turn according to the invention, or any other interaction incorporated into the system and chosen by the user.

It is important to repeat that the inventions described herein are adaptable to any digital video system, particularly those which use reference frames and dependent frames and are not limited to use in digital video complying with the MPEG standard.

ATTACHMENT 1

MPEG STREAMER INTERFACE DEFINITION

---

MPEG STREAMER INTERFACE DEFINITION

```
typedef long SVPRC;            // Return code value
typedef void *SVPSuperHandle;// Blind handle used by streamer
// This structure defines an MPEG transition
typedef struct tagMPEGTRANS
{
  long m__lLength;          // Length of data in m__pData
  unsigned char *m__pData; // Actual MPEG data for transition (all B frames),
                            // 'm__lLength' bytes long
  unsigned long m__ulFlags; // Flags, see MPTF__defines below
  short m__sNumFrames;      // Number of B-frames in this transition
  SVPRect *m__pPans;        // Amount by which to pan; m__sNumFrames elements or NULL
                            // if the MPTF__PANS bit is not on
}MPEGTRANS;
#define MPTF__PANS 0x01    // Transition has panning information
//
// This structure is used for seeking and to indicate the current frame in any of the
// frame sync functions. Note that when you call MpegSeekMPTE or MpegSeekFrame, only the
// SMPTE or FrameNum portions are looked at for input and the other portion is appropriately
// updated on return
//
typedef struct tagSYNCINFO {
    long        m__lFrameNum;    // INOUT - Current frame number - 0 is the first frame
    BYTE        m__nSMPTEHour;   // INOUT - Hour component of SMPTE time code
```

-continued

MPEG STREAMER INTERFACE DEFINITION

```
  BYTE          m__nSMPTEMin;      // INOUT - Minute component of SMPTE time code
  BYTE          m__nSMPTESec;      // INOUT - Second component of SMPTE time code
  BYTE          m__nSMPTEFrame;    // INOUT - Frame count component of SMPTE time code
  BYTE          m__nFrameType;     // INOUT - Type of the current FRAME (I, P, B, D)
}SYNCINFO;
#define MAX_PICS_PER_BUFFER 20 // Max number of pictures per MPPBuffer
typedef struct MPPPicInfoTag
{
  long m__lPicNum;           // Picture number (0-origin)
  long m__lOffset;           // Offset of this picture in the buffer
}MPPPicInfo;
// Codes for the m__nInUse field of MPPBuffer
#define MPPBuffer__FREE 0 // Buffer is available
#define MPPBuffer__PLAYER 1 // Buffer is in use by player
#define MPPBuffer__UPDATE 2 // Buffer is being updated, do not use
typedef struct MPPBufferTag
{
  struct MPPBufferTag *m__pNext; // Next buffer in chain (used by streamer only)
  void *m__pvData;      // MPEG data
  long m__lFileOffset;  // File offset of MPEG data
  long m__lLength;      // Length of MPEG data
  long m__lMax;         // Maximum length allocated
  long m__lTag;         // Tag of MPPBuffer
  long m__lNumFrames;   // Number of frames in MPEG data
  int m__nInUse;        // See MPPBuffer_codes above
  MPPPicInfo m__
PicInfo[MAX_PICS_
PER_BUFFER];
                    // List of picture number/offset combinations,
                    // sorted by offsets.
}MPPBuffer;
// MPSOpen initializes the streamer on the given file. The file will
// usually be the clip hunk generated by the binder.
SVPRC MPSOpen(SVPSuperHandle &sup, const char *strFileName);
// MPSClose closes a previously-opened file
SVPRC MPSClose(SVPSuperHandle sup);
// MPSSeek seeks the currently-open stream to the given file number
SVPRC MPSSeek(SVPSuperHandle sup, long lFrameNum);
// MPSCacheFrame copies the specified frame number into the frame
// cache without displaying it. Typically the cache ID is the first
// frame of the actual TO video clip, while the lFrameNum parameter
// is the frame number of the cached copy of the TO frame that the
// binder copies into the clip hunk.
SVPRC MPSCacheFrame(SVPSuperHandle sup, long lFrameNum, long lCacheID);
// MPSDeCacheFrame removes a previously-cached frame from the cache.
SVPRC MPSDeCacheFrame(SVPSuperHandle sup, long lCacheID);
// MPSDeCacheAll removes all previously-cached frames from the cache
SVPRC MPSDeCacheAll(SVPSuperHandle sup);
// MPSPlayTransition causes a transition to play using the MPEG frame
// that is currently in the future buffer as the FROM frame and the
// specified cached frame as the TO frame. The transition to use is
// specified by the pMpegTrans structure passed in.
SVPRC MPSPlayTransition(SVPSuperHandle sup,
                        MPEGTRANS *pMpeg Trans,
                        long lCacheID,
                        long lSeekFrame = 1);
// MPSWork must be called periodically to give the streamer a chance to
// read data and to give a software player, if one is being used, a
// chance to do its work.
SVPRC MPSWork(SVPSuperHandle sup, SYNCINFO *pSyncInfo);
// MPSChopStream terminates the currently-playing MPEG stream after
// the specified frame number. Used for eliminating information that
// has already been read but has not yet been sent to the MPEG
// player in preparation for exiting the current clip.
SVPRC MPSChopStream(SVPSuperHandle sup, long lFrameNum);
// MPSHoldVideo is used to prevent the streamer from reading any more
// video from the clip hunk. Used before an MPSChopStream call to
// make sure the streamer doesn't read any more video before the
// transition takes place.
SVPRC MPSHoldVideo(SVPSuperHandle sup, int hold);
```

What is claimed is:

1. A computer-implemented method of generating transition effects between two frames of digitally compressed video by manipulating the output of a digital video decoder which said decoder comprises a past buffer and a future buffer, said method comprising the steps of:

a. selecting a FROM frame in a video stream and a TO frame in a video stream;

b. placing the FROM frame in the past buffer of said decoder;

c. placing the TO frame in the future buffer of said decoder;

d. generating a stream of bidirectionally dependent duplicator frames having motion vector references to a past reference frame and a future reference frame wherein the constituent frames of said stream of bidirectionally dependent duplicator frames vary in their motion vector references to said FROM frame and said TO frame according to a predefined pattern;

e. feeding said stream of bidirectionally dependent duplicator frames to said decoder, causing said duplicator frames to be displayed; and f. beginning normal playback of the video stream containing the TO frame at the TO frame position.

2. A computer-based system for generating transition effects between two frames of digitally compressed video by manipulating the output of a digital video decoder which decoder comprises a past buffer and a future buffer, comprising:

a. means for selecting a FROM frame in a video stream and a TO frame in a video stream;

b. means for placing the FROM frame in the past buffer of said decoder;

c. means for placing the TO frame in the future buffer of said decoder;

d. means for generating a stream of bidirectionally dependent duplicator frames having motion vector references to a past reference frame and a future reference frame constituent wherein the frames of said stream of bidirectionally dependent duplicator frames vary in their motion vector references to said FROM frame and said TO frame according to a predefined pattern;

e. means for feeding said stream of directionally dependent duplicator frames to said decoder, causing said duplicator frames to be displayed; and f. means for beginning normal playback of the video stream containing the TO frame at the TO frame position.

3. A system according to claim 2 wherein said selecting means comprises identification of permitted FROM and TO frames during an edit process.

4. A system according to claim 2 wherein said generating means comprises creation of said stream of bidirectionally dependent duplicator frame during an edit process.

5. A system according to claim 2 wherein said generating means comprises creation of said stream of bidirectionally dependent duplicator frames on-the-fly during playback.

6. A system according to claim 2 wherein the transition effects are used to mask the time required to prepare said decoder to play back the video stream containing the TO frame at the TO frame position.

7. A system according to claim 2 wherein said generating means, said TO frame placing means, said FROM frame placing means, said feeding means and said means for beginning normal playback comprise use of a streamer means wherein said decoder is fed a digital video stream from a streamer buffer in which various video frames from various sources are sent to said streamer buffer where they are combined into a virtual video stream.

8. A system for generating transition effects between a FROM frame in a stream of digitally compressed video and a TO frame in a stream of digitally compressed video by manipulating the output of a digital video decoder which said decoder comprises a past buffer and a future buffer, comprising:

a. a computer;

b. said computer being programmed to:

i. place the FROM frame in the past buffer of said decoder, ii. place the TO frame in the future buffer of said decoder, iii. generate a stream of bidirectionally dependent duplicator frames wherein the constituent frames of said stream of bidirectionally dependent duplicator frames vary in their motion vector references to said past buffer and said future buffer according to a predefined pattern, iv. feed said stream of duplicator frames bidirectionally dependent to said decoder, causing said duplicator frames to be displayed, and v. begin normal playback of the video stream containing the TO frame at the TO frame position.

9. A computer-readable medium for causing a computer to generate transition effects between a FROM frame in a stream of digitally compressed video and a TO frame in a stream of digitally compressed video by manipulating the output of a digital video decoder which said decoder comprises a past buffer and a future buffer, comprising:

a. a computer-readable storage medium; and b. a computer program stored on said storage medium;

c. said computer program comprising:

i. means for placing the FROM frame in the past buffer of said decoder;

ii. means for placing the TO frame in the future buffer of said decoder;

iii. means for generating a stream of bidirectionally dependent duplicator frames wherein the constituent frames of said stream of bidirectionally dependent duplicator frames vary in their motion vector references to said past buffer and said future buffer according to a predefined pattern;

iv. means for feeding said stream of bidirectionally dependent duplicator frames to said decoder, causing said duplicator frames to be displayed; and v. means for beginning normal playback of the video stream containing the TO frame at the TO frame position.

10. A computer-readable medium according to claim 9 wherein:

a. the FROM frame is a non-reference frame; and b. said means for placing the FROM frame in the past buffer of said decoder comprises means for copying the decoded data of the FROM frame directly into the past buffer of the decoder.

11. A computer-readable medium according to claim 9 wherein:

a. the TO frame is a non-reference frame; and b. said means for placing the TO frame in the future buffer of the decoder comprises means for copying the decoded data of the TO frame directly into the future buffer of the decoder.

12. A computer-readable medium according to claim 9 wherein said transition effects are generated in response to user input or program signal.

13. A computer-readable medium according to claim 9 wherein said means for placing said TO frame in said future buffer comprises:

a. means for storing at least one possible TO frame in at least one TO frame buffer; and b. means for sending the appropriate TO frame to said decoder after said decoder receives said FROM frame.

14. A computer-readable medium according to claim 9 further comprising upgrading means whereby said FROM frame and said TO frame if originally encoded as reference frames are upgraded to reference frames.

15. A computer-readable medium according to claim 14 wherein said TO frame is upgraded to a reference frame with no dependencies on other frames.

16. A computer-readable medium according to claim 14 wherein said FROM frame and said TO frame are upgraded by reencoding the video streams where an encoder is instructed to encode said FROM frame and said TO frame as the required frame type.

* * * * *